(12) United States Patent
Jacobus et al.

(10) Patent No.: US 11,961,041 B2
(45) Date of Patent: Apr. 16, 2024

(54) AUTOMATED WAREHOUSING USING ROBOTIC FORKLIFTS OR OTHER MATERIAL HANDLING VEHICLES

(71) Applicant: Cybernet Systems Corp., Ann Arbor, MI (US)

(72) Inventors: Charles J. Jacobus, Ann Arbor, MI (US); Glenn J. Beach, Grass Lake, MI (US); Steve Rowe, Grass Lake, MI (US); Charles J. Cohen, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 352 days.

(21) Appl. No.: 17/074,351

(22) Filed: Oct. 19, 2020

(65) Prior Publication Data
US 2021/0035056 A1 Feb. 4, 2021

Related U.S. Application Data

(63) Continuation of application No. 16/506,054, filed on Jul. 9, 2019, now Pat. No. 11,367,043, which is a
(Continued)

(51) Int. Cl.
*G06F 7/00* (2006.01)
*B66F 9/06* (2006.01)
(Continued)

(52) U.S. Cl.
CPC ........... *G06Q 10/087* (2013.01); *B66F 9/063* (2013.01); *B66F 9/0755* (2013.01);
(Continued)

(58) Field of Classification Search
CPC ..... G06Q 10/087; B66F 9/063; B66F 9/0755; G05D 1/0234; G05D 1/0246;
(Continued)

(56) References Cited

U.S. PATENT DOCUMENTS

| 8,965,104 B1 * | 2/2015 | Hickman | G06V 10/96 |
| | | | 382/254 |
| 10,102,629 B1 * | 10/2018 | Li | G06T 7/521 |

(Continued)

FOREIGN PATENT DOCUMENTS

| DE | 202007019542 U1 * | 11/2013 | G01C 21/12 |
| JP | 2005089013 A * | 4/2005 | |

*Primary Examiner* — Yolanda R Cumbess
(74) *Attorney, Agent, or Firm* — Fishman Stewart PLLC

(57) ABSTRACT

Automated inventory management and material (or container) handling removes the requirement to operate fully automatically or all-manual using conventional task dedicated vertical storage and retrieval (S&R) machines. Inventory requests Automated vehicles plan their own movements to execute missions over a container yard, warehouse aisles or roadways, sharing this space with manually driven trucks. Automated units drive to planned speed limits, manage their loads (stability control), stop, go, and merge at intersections according human driving rules, use on-board sensors to identify static and dynamic obstacles, and human traffic, and either avoid them or stop until potential collision risk is removed. They identify, localize, and either pick-up loads (pallets, container, etc.) or drop them at the correctly demined locations. Systems without full automation can also implement partially automated operations (for instance load pick-up and drop), and can assure inherently safe manually operated vehicles (i.e., trucks that do not allow collisions).

17 Claims, 20 Drawing Sheets

Related U.S. Application Data continuation of application No. 15/715,683, filed on Sep. 26, 2017, now Pat. No. 10,346,797.

(60) Provisional application No. 62/399,786, filed on Sep. 26, 2016.

(51) Int. Cl.
*B66F 9/075* (2006.01)
*G05D 1/00* (2006.01)
*G06K 19/06* (2006.01)
*G06K 19/077* (2006.01)
*G06Q 10/087* (2023.01)

(52) U.S. Cl.
CPC ......... *G05D 1/0234* (2013.01); *G05D 1/0246* (2013.01); *G05D 1/0274* (2013.01); *G06K 19/06037* (2013.01); *G06K 19/07758* (2013.01); *G05D 2201/0216* (2013.01)

(58) Field of Classification Search
CPC ......... G05D 1/0274; G05D 2201/0216; G06K 19/06037; G06K 19/07758
USPC ........................................ 700/213–215, 228
See application file for complete search history.

(56) References Cited

U.S. PATENT DOCUMENTS

| | | | |
|---|---|---|---|
| 2009/0234499 A1* | 9/2009 | Nielsen | B25J 9/161 700/250 |
| 2016/0185291 A1* | 6/2016 | Chamberlin | B60Q 9/00 701/70 |
| 2016/0266578 A1* | 9/2016 | Douglas | G05D 1/0027 |
| 2016/0282126 A1* | 9/2016 | Watts | G09B 29/004 |
| 2017/0336788 A1* | 11/2017 | Iagnemma | B60W 60/0011 |
| 2017/0357270 A1* | 12/2017 | Russell | G06V 20/58 |
| 2018/0109767 A1* | 4/2018 | Li | H04N 7/185 |

\* cited by examiner

Camera Pitch Angle, Roll Angle, Yaw Angle, X, Y, Z relative to the code is acquired from deciphering the code

AUTOMATED WAREHOUSING USING ROBOTIC FORKLIFTS OR OTHER MATERIAL HANDLING VEHICLES

REFERENCE TO RELATED APPLICATIONS

This Application is a continuation of U.S. patent application Ser. No. 16/506,054, filed Jul. 9, 2019, which is a continuation of U.S. patent application Ser. No. 15/715,683, filed Sep. 26, 2017, now U.S. Pat. No. 10,346,797, which claims priority to U.S. Provisional Patent Application Ser. No. 62/399,786, filed Sep. 26, 2016, the entire content of all related applications being incorporated herein by reference.

FIELD OF THE INVENTION

This invention relates in general to containerized material handling systems, and more particularly, to a method and system for locating, identifying, acquiring, stacking, and transporting inventory items within an inventory system.

BACKGROUND OF THE INVENTION

Modern inventory systems, such as those in container yards, warehouses, superstores, mail-order, e-commerce warehouses and larger manufacturing facilities, use dedicated crane and gantry storage. Such environments also utilize retrieval systems that require dedicated space and large capital investment or vertical pallet or container stacking served by manually driven fork or container hauling trucks. The former provides fast, accurate responses to requests for load, unloading and inventory of items in transit but is a large integrated capital and space investment. On the other hand, manually driven container vertical lift truck based storage systems or yards can cause delays and backlogs in the process of responding to load, unload and inventory requests, and furthermore require drivers and loaders and their salaries, benefits, and management burden.

Historically, most loading, unloading and inventory systems are based around vertical storage stacking using pallets or other standardized containers. This arrangement offers a compromise between easy access and three-dimensional storage to reduce area footprint. This type of storage is accessed by forklifts and container handlers of various configurations. The typical way this type of three-dimensional storage is automated is through gantry style S&R or crane units that provide three-dimensional access to the pallet storage locations along a fixed set of travels (i.e., row selection, perhaps through an automated conveyor; column selection with a pallet transport device moving along a preplaced rail, and vertical pallet/container retrieval or storage along an elevator lift mechanism).

The type of automation just described is expensive, requires rework of the entire storage/retrieval space, and is an all or nothing proposition—one cannot practically partially automate a space—it either is automated or remains manually retrieved with forklifts or container handlers.

The invention disclosed in our prior U.S. Pat. No. 8,965,561, Jacobus et al. describes an approach that assumes use of conventional forklifts and similar container transport platforms, some of which may be equipped with automation enabling them to operate safely along with manually drive lifts into and out of the warehouse. The '561 Patent discloses manual systems enhanced with automation to support more productive automated load acquisition and placement, as well as to improve operator safety by cueing proximal obstacles to the operator in real time.

The '561 Patent further describes pallet engagement and disengagement as beginning with inventory requests; i.e., requests to place palletized material into storage at a specified lot location or requests to retrieve palletized material from a specified lot. These requests are resolved into missions for autonomous fork trucks, equivalent mobile platforms, or manual fork truck drivers (and their equipment) that are autonomously or manually executed to effect the request. Automated trucks plan their own movements to execute the mission over the warehouse aisles or roadways, sharing this space with manually driven trucks. Automated units drive to planned speed limits, manage their loads (stability control), stop, go, and merge at intersections according human driving rules. The automated units also use on-board sensors to identify static and dynamic obstacles and people and either avoid them or stop until potential collision risk is removed. Safety enhance manual trucks use the same sensors to provide the operator with collision alerts and optionally automate load localization and acquisition behaviors for productivity enhancement.

Automated or partially automated trucks have the ability to execute task specific behaviors as they progress along the mission, including visiting palletizing/depalletizing, refueling, based upon locations in the order defined by the mission. The vehicles have the ability to drive into or through tight openings using sensor-based driving guidance algorithms, and perform pallet finding and engagement and disengagement onto pallet stacks and into shelving units. Load control automated trucks also can identify pallet locations and pallet identification codes by standard commercial means including but not limited to RFID, barcode, UID, optical characters on printed labels through computer vision/camera, and RF code readers. Each automated truck can be placed into manual drive mode at anytime, and along with unmodified manual fork trucks can be driven over the shared space concurrently used by automated trucks. The automated lift can sense pallets or load positions to control the loading and unloading (or stacking/unstacking) operation, can read pallet identifications (barcodes, RFID, printed labels), can identify moving and fixed obstacles, and can plan from-to paths through using data in the warehouse map.

Manually driven trucks can also be enhanced to include obstacle proximity sensing systems that, instead of directly changing the truck path behavior, alert the operator as to presence or unsafe proximity to the obstacle, indicating a collision risk and even partial automation that might change the trucks speed or cause it to initiate automated braking. Similarly, partial or complete automation of the load acquisition or placement function of a manual truck can be included that operate as indicated for fully automated trucks in the previous paragraph to support more automated and efficient load pick-up and placement operations.

SUMMARY OF THE INVENTION

This invention relates in general to containerized material handling systems, and more particularly, to a method and system for locating, identifying, acquiring, stacking, and transporting inventory items within an inventory system. This disclosure describes how pallets are engaged and disengaged, both mechanically and in conjunction with video and 3D range measurement sensors. Aspects regarding the fusion of sensing, mechanical action, and motion planning to accomplish material acquisition, handling, and dispersal are described in the background section of this disclosure and in U.S. Pat. No. 8,965,561, the entire content of which is incorporated herein by reference.

In accordance with this invention, an automated material handler can sense pallet/container load positions, read load identifications (barcodes, RFID, printed labels), identify moving and fixed obstacles, and plan from-to paths using data in a warehouse or yard map. Based on sensing behavior, the automation kit can obey human-like driving rules (for instance, maintain spacing with the moving object in front, stop at intersections, use the right-first rule when multiple vehicles arrive at the intersection at the same time, drive around stopped obstacles safely, stop for pedestrians who cross the travel area intersecting the lift's travel route, etc.). Thus, they navigate to approximately where a load will be delivered or acquired.

Navigation out-of-doors may be accomplished by precision GPS fused with orientation and inertial sensing as previous described in U.S. Pat. No. 8,965,561 and commonly employed by autonomous or driverless vehicles described as least since 1985 experiments demonstrated on the DARPA Autonomous Land Vehicle and Carnegie-Mellon Navlab. However, indoor navigation by GPS does not work because building structure blocks the radio reference information used for it. Alternatives include:

Embedded floor wires that are tracked by magnetic or other electronic means marking drive paths. The automated vehicle can then maneuver along a path by staying in position relative to the wire. At lane changes or intersections, the vehicle can go off wire for a short time using Dead Reckoning with wheel encoders and/or inertial sensors until a new wire track is reacquired.

Painted lines on the floor effectively track by optical or video sensors, also marking drive paths or lanes. The automated vehicle can then maneuver along a path and change lanes or turn at intersections in the same way as with embedded wire tracks.

Retro-reflective targets mounted on walls with line-of-sight to a laser beacon on the vehicle. By measuring the angle to two reflectors, the automated vehicle can know its location and with an addition sighting (or an alternative orientation sensor) it can know its heading as well. Thus, paths, intersections, etc. can be defined on a virtual map the vehicle can track.

Magnetic Markers in the floor. These operate like discrete breadcrumbs marking points on the drive path between segments driven by inertial Dead Reckoning.

Each of these approaches, previously described in the literature, have strengths and weaknesses. Embedded wires or magnetic markers are costly to install, allow only limited motion paths, but are rugged and robust to wear and tear. Painted paths are low cost, but wear off or get dirty over time and require maintenance—while also only allowing limited motion paths. Wall retro reflectors require less maintenance or cleaning, but require that there be lines of sight from vehicle to at least two reflectors for any absolute position update. Furthermore, the work space floor has to be maintained to planar to a high precision.

Finally, these means of navigation only get a vehicle close to its final pallet pick-up or put-down location. Over time, due to limited autonomous system precision or imprecision from also employing manually driven material handling trucks, lot locations (one or more pallets with similar parts stored or stacked on them) are variable within some tolerance or epsilon of the location know in an inventory managements system delivering requisition commands to the autonomous systems. For manual systems, an operator recognizes and compensates for these small positional errors at the terminal point, and therefore autonomously controlled material handlers have to have similar capabilities.

In this invention disclosure we describe using a combination of video capture and processing, 3D range measurement and processing, and definition, imaging, and capture of a location estimating barcodes to allow automated material handling trucks (or manually controlled trucks with automated material acquisition or placement functions to relieve the drive of complex motion control operations) precision locate, capture, and manipulate pallets or container for loading, unloading and stacking/destacking operations.

BRIEF DESCRIPTION OF THE DRAWINGS

FIG. 32A illustrates a code viewed head-on; and

DETAILED DESCRIPTION OF THE INVENTION

This invention resides in an automated material handling, transporting supporting inventory management system that removes the requirement to operate fully manually using conventional vertical storage and retrieval machines and or cranes. The approach assumes use of conventional forklifts and similar container transport platforms, some equipped with automation for operating safely along with manually drive lifts into and out of the warehouse. In addition, some manual systems may be enhanced with automation to support more productive automated load acquisition and placement as well as to improve operator safety by cueing proximal obstacles to the operator in real time, as disclosed in the '561 Patent referenced herein.

As further described in the '561 Patent, driverless vehicle navigation GPS and inertial dead reckoning provides an effective technique for automated truck self-location (and therefore provides a convenient means for controlling the truck to a predefined path) when operating outdoors within line of sight of GPS satellites. However, indoors where line of sight is denied, other means must be utilized. While floor markers of various types have been used in the automated guided vehicle industry for many years, they suffer from the need to preplace path or fiducial markers on or in the floor and limit vehicle drive path options [U.S. Pat. No. 7,826,919, D'Andrea, et al.].

Our approach uses specialized and generalized:
  Row or edge following (for instance identification of aisles as floor areas extending between vertical features, typically walls or shelving units);
  Door finding and tracking (identifying openings in walls or shelving units);
  Target pick/placement locations by identifying and locating templates or models (matching a object, example: truck trailer, shelving unit, or other location using a 3D model of its shape as viewed from a material handling truck from its approach track to that object);
  Pallet opening, edges, and top locations (identification of two openings low down for fork engagement; locating edges to the left and right of the pallet front to identify extent, and locating pallet or pallet stack top to identify where the top pallet in a stack is either for removing it or stacking another pallet on top of it);
  Identifying pallet locations, pallet types, lot identifiers, and key isle-way locations by barcode and/or printed label identifiers linked to those locations on a digital map of the traversal space.

Figure 1:
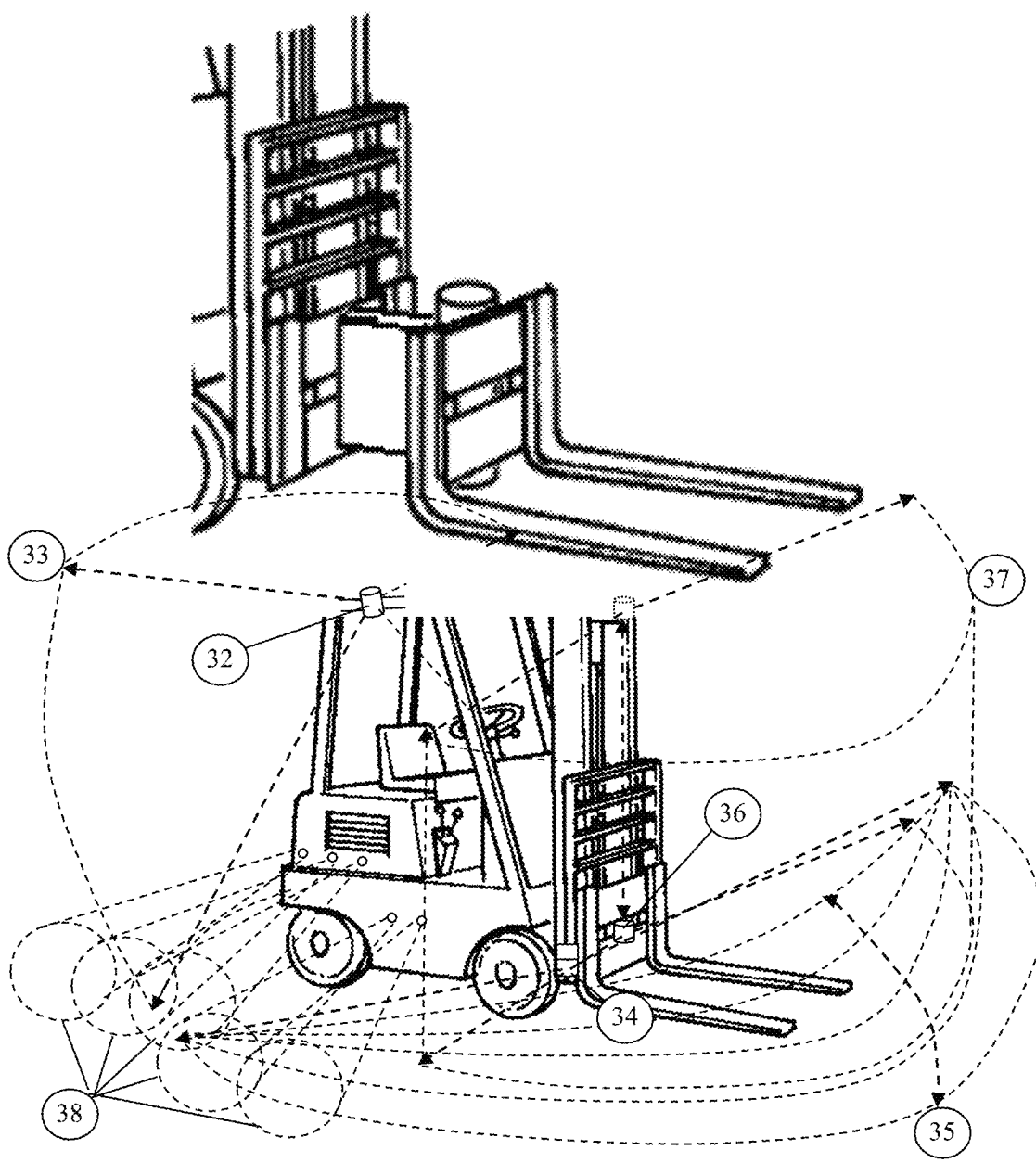
FIG. 1 illustrates Lift Truck Collision Detection Sensors.
Figure 6:
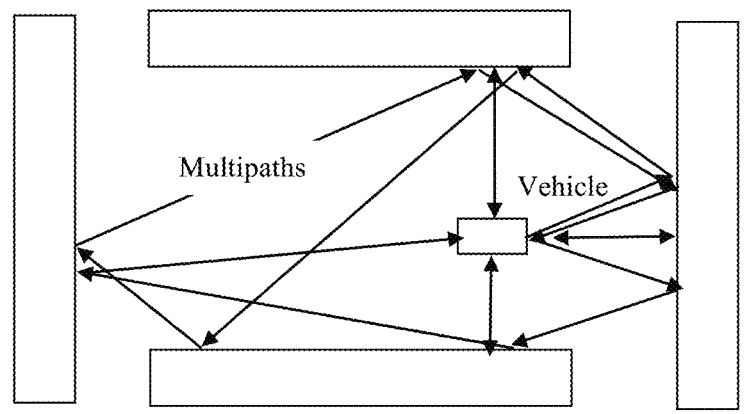
FIG. 6 depicts Multipath in Ultrasonic or RF locators operating in a warehouse.

FIG. 1 shows an. Automated or industrial vehicle having a fork. The actual load pick-up and placement operations (palletizing and depalletizing) are described as utilizing two front mounted laser sensors are shown in FIG. 1 (FIG. 6 in 8,965,561). One laser sensor (34) is mounted on the mast near the floor. This unit can be scanned up and down at a small angle by tilting the mast (35) up and down. The laser sensor (34) is primarily tasked with detecting forward driving obstacles, but can also be used to find pallets and pallet stacks. A second laser sensor (36) is fixed to the fork elevator and sweeps a half cylindrical area (37) as the lift moves up and down the mast. This sensor is tasked primarily for detecting pallet fork openings and the top pallet in a pallet stack, but it too can aid system in sensing obstacles when driving forward. It is noted that between these two sensors the automated truck has almost 100% unobstructed obstacle visibility and is thus, far superior to a human driver's visibility because he/she has to sight through the front forks.

Figure 2:
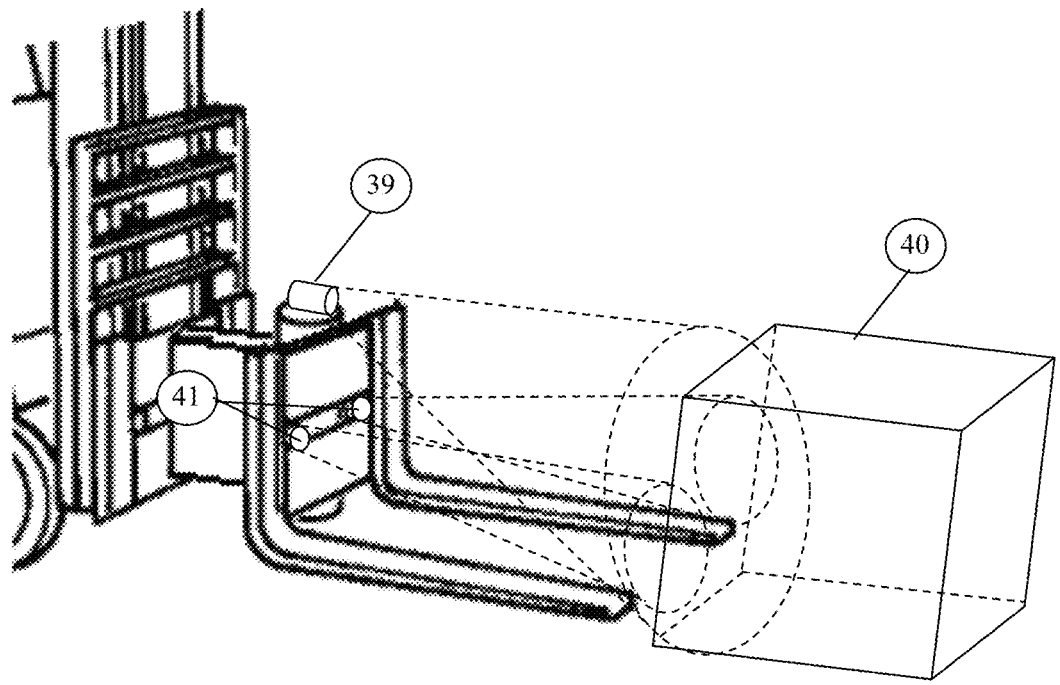
FIG. 2 depicts Lift Truck Pallet/Lot Identification Sensors.

FIG. 2 shows placement of several video based sensors used to find and read a pallet identifier. The top camera (39) images the entire side of the pallet (40) and uses image processing to identify the gross placement of the bar code, UID, Character notations (OCR) or other identification markers. Then the two smaller field cameras (41) are used to hone in and read the code identifier at sufficient resolution to achieve reliable code deciphering. Alternatively, or in addition, these video-based sensors could include a short range RFID reader or any alternative pallet identification method. An advantage of using cameras is that they can also be used to place roadway or path segment signage up in the warehouse.

Figure 3:
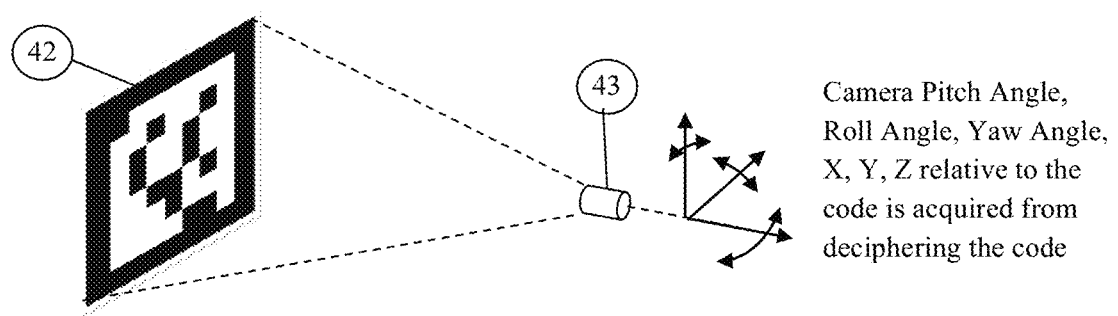
FIG. 3 shows how Artool Kit barcodes localize the camera (affixed to the lift) offsets to the code location.

FIG. 3 shows a two-dimensional type of barcode (42) that is in the public domain [Artool Kit, 2012] that can code both content data (the internal bit pattern codes the content) and location of the lift truck relative to the sign placement location. For this code a camera (43) and simple image processing algorithm finds the black square frame, resolving the location of its corners. It then reads the internal bit pattern adjusted for perspective skew. If the deciphered code is "correct", i.e. can be validated as having been assigned to a known location, its location when added to the offset from the code to the lift truck provides the truck automation controller an exact fix within the warehouse area. These barcodes (42) could also be placed on the floor as easily as anywhere other known location in the warehouse.

Figure 4A:
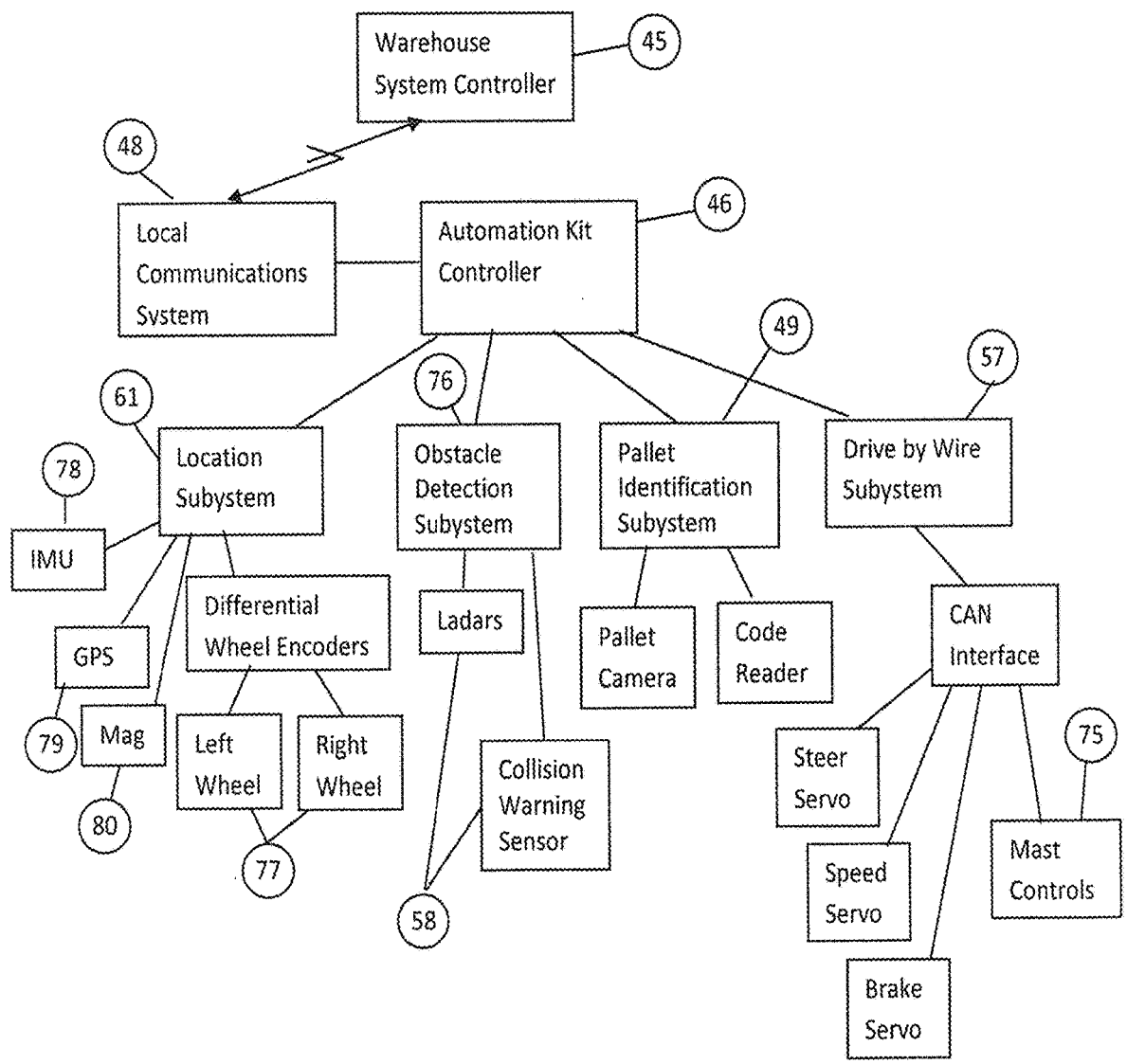
FIG. 4A is a block diagram of a material handling system according to the invention.
Figure 4B:
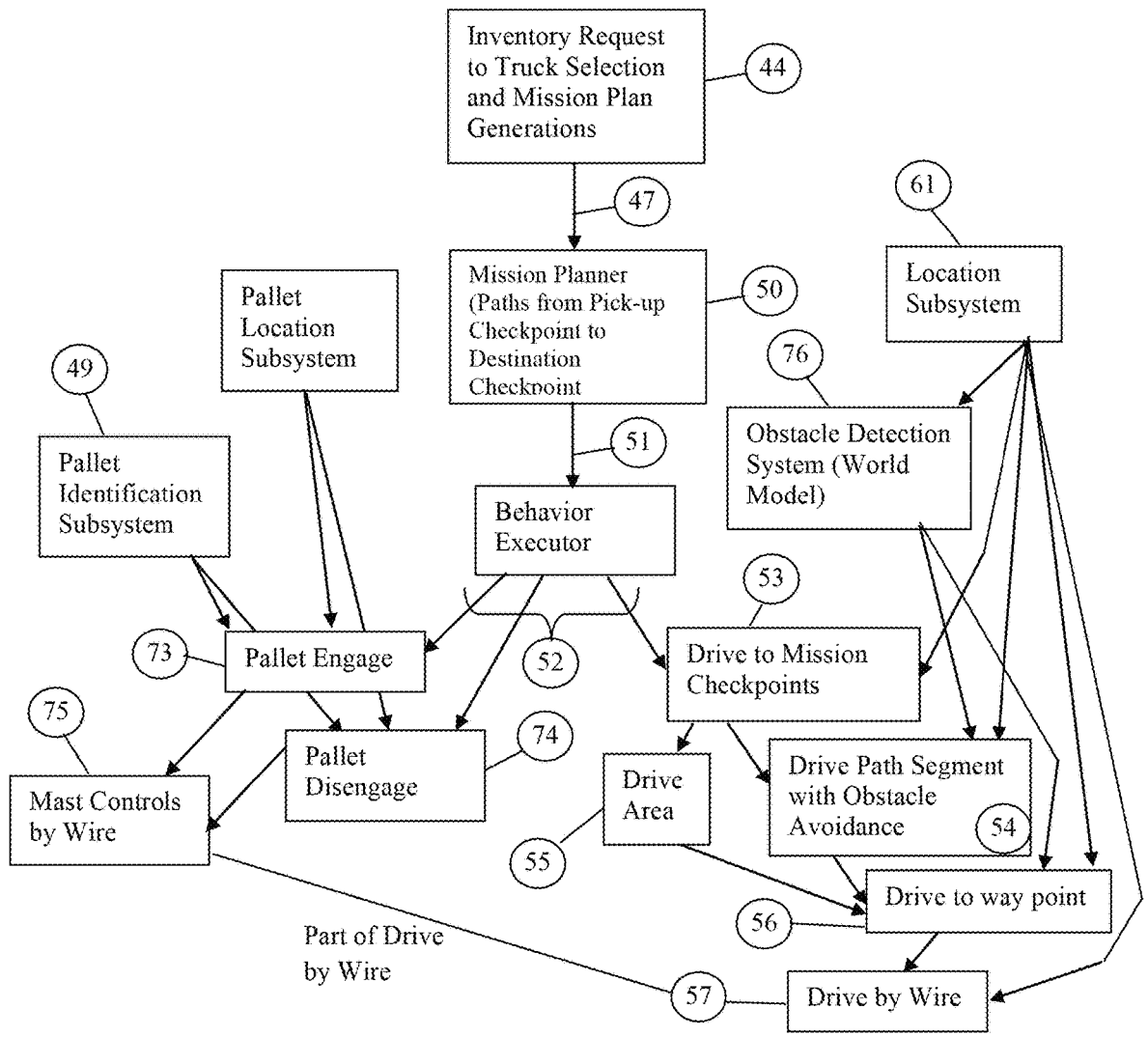
FIG. 4B illustrates Automates Lift Control Software Architecture.
Figure 10:
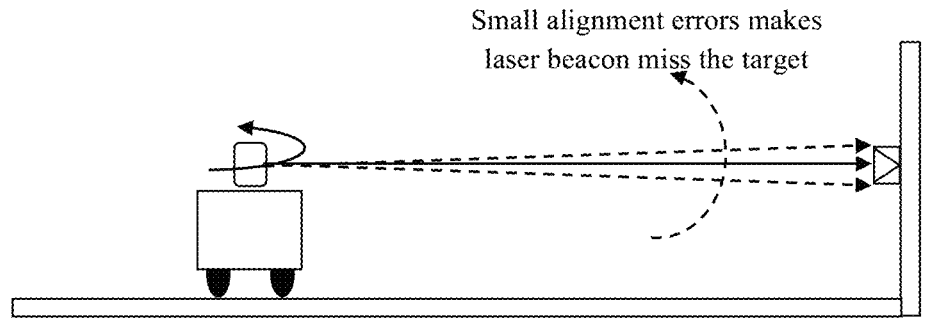
FIG. 10 shows how laser beacon based fixes require a flat floor so that narrow laser beam can hit the retro reflective target at long distances.

In FIG. 4B, summarizing automated truck functions, pallet engagement (73) and disengagement (74) as described use range data sets, but in an engagement task specific manner. Pallet engagement is performed in three steps. First the lift truck approaches the approximate position of the pallet stack provided to it as the source or destination location (with orientation) defined by the system controller and provided to the truck in the mission definition. In the second step the truck stops and evaluates its local obstacle map (FIG. 10) for the nearest pallet stack at or beyond its stop position, which it then aligns to. In the third step, the truck uses its mast-controls-by-wire (75) and sensors to:
  1. Scan and capture the pallet stack from bottom to top (or to a predefined maximum height).
  2. Determine the precision position of the pallet stack face.
  3. Move the forks to the correct position for stack approachment (for picking a pallet this is alignment with the fork holes of the topmost pallet; for placing a pallet this is alignment to the space just above the topmost pallet).
  4. If a pick operation, it optionally uses the wide area camera (39) to find the pallet identification barcode and one of the narrow angle cameras (41) to identify the pallet by reading its pallet identifier. If placing a pallet, lot identification is done on any pallet that is down from the topmost pallet in the stack. Alternative means of identification can be use with or instead of these methods, including RFID, etc.

5. Upon pallet or lot identification, the lift moves forward to align the payload pallet to the stack (or to insert the forks into the topmost pallet holes).
6. To engage, the lift truck lifts the topmost pallet up and pulls back away from the stack; to disengage, it lowers the forks until the pallet rests on the top of the stack and then the lift slightly lifts up and pulls back away from the stack.
7. It then lowers it forks to the predetermined safe travel level above the floor, plans its next movement, and executes the plan, to take the lift and its payload to the next destination (or back to the source location).

Figure 8:
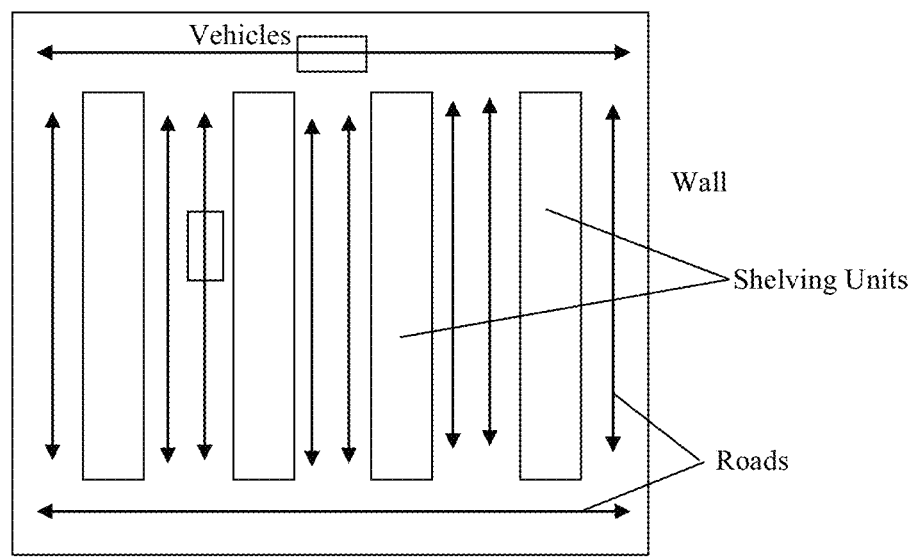
FIG. 8 illustrates how rows and columns create roads.

As shown in FIG. 4A (FIG. 8 of the '561 Patent, incorporated herein by reference in Para. [0015]), a vehicle automation controller (46) receive-?, a mission plan (47 over a local communications link (48). The controller (46) interfaces with various on-board modules, including subsystems for auto-location (61), obstacle detection (76), pallet/payload identification (49) and drive-by-wire (57). The location subsystem (61) interfaces to various sensors, including absolute and relative location. Absolute sensors include cameras, lasers/LIDAR and other location sensors (58), magnetometers (80), and GPS (79), whereas relative sensors include wheel encoders (77) and inertial measurement (IMU). As used herein, "controller" should be taken to include computer, processor, CPU or other hardware and software used for automation, including location computation, as well as the processing images from cameras and inputs from sensors.

Indoor Navigation to Load or Unload Points

Maps, lanes, free maneuver areas—The core capability of autonomous driverless vehicles is self-location knowledge. By fusing inputs from sensors, wheel revolution counters, and inertial units, the self-location subsystem continuously estimates material handling truck location within the maneuver area. For driverless cars that operate out of doors, this has been described as a fusion of GPS geolocation signal and inertial sensors that measure all locations by extrapolation of forces and torques applied since the last reliable location fix. The inertial component provides for both filtering orientation and position determined by GPS through the assumption that small location variations are not actual location changes if the vehicle has not been commanded to move in all direction variation might be reported, and can provide positional estimates based on integration force and torques into position and orientation changes of vehicle location extrapolated from the last reliable GPS fix.

Figure 5:
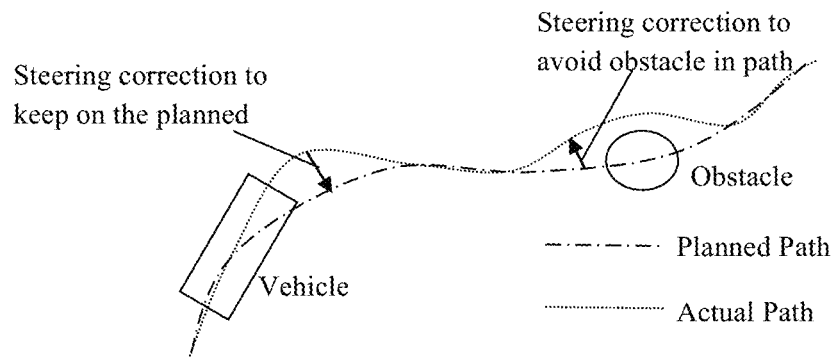
FIG. 5 shows Path Following.

Paths along map encoded routes or across areas where free driving is allowed, can be enforced by comparing the vehicle self-locations against planned paths, error or path deviations, thereby generating steering correction feedback so that the vehicle approximately follows the planned path to accomplish movement from a point A to point B along allowed driving lanes. Even maneuvers to circumnavigate around obstacles will be generated and executed as small localized path changes and therefore are accomplished through the same basic steering and movement control system [FIG. 5].

When the automated vehicle operates to follow paths to endpoints inside of a warehouse, using GPS as the reliable position fixing sensor becomes impossible because line of sight reception of GPS signals from satellites is not possible. While some systems based on RF radio location or ultrasonic location finding have been suggested for indoor premises, all broadcast approaches suffer from inaccuracies due to multipath (i.e. more than one possible path to the broadcasting beacon and back again to a receiver) prevalent in dense warehouse type settings. For instance, shelving units might be made of metal or may have metal supports, each of which becomes a disbursing and reflecting element to radio frequency signals. Each reflection generates a new transmit or return path of length different to straight line of sight path from target to receiver, and thus confounds computations that convert sightings to vehicle localization [FIG. 6].

Our approach for indoor navigation is therefore based on (a) tracking vehicle movement across the warehouse floor as precisely as possible (Dead Reckoning) and (b) identifying, sighting, and tracking features at known locations within the facility (e.g., location fixed features or "LFFs"), either naturally occurring or placed, and using that information to localize the automated vehicle from key point to the next point (and using Dead Reckoning for localization between where these feature points are precisely known).

Dead Reckoning—This is localizing the vehicle position from precisely measuring movement. If a vehicle moves from a known point A [x, y] and orientation β by a known distance and orientation change [Δx, Δy, Δβ], then we can know its position from the known point as [x+Δx, y+Δy, β+Δβ], indefinitely as the Δ measurements are perfectly accurate. Due to measurement error, €, they will not be, so practically error creeps into the position estimates proportional to the number of measurements taken, n*€, and eventually makes this method of localization too imprecise to use. For shorter intervals between more accurate localizations from GPS fixes or sightings of facility location fixed features (LFFs), Dead Reckoning is very useful, since the vehicle continuously knows its approximate location for continuous path following (with steering corrections).

Figure 7:
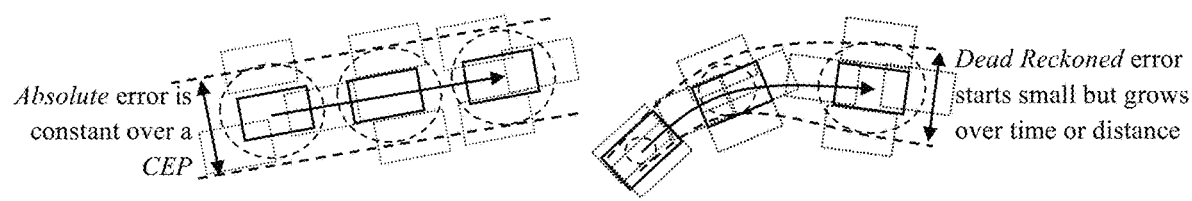
FIG. 7 shows Absolute error character as compared to Dead Reckoned error.

Absolute coordinate fixes like those from GPS and LFFs are collected with non-systematic errors (typically random walk errors within some specified circular error probability or CEP). Therefore, vehicle location based on coordinate fixes will vary within some predictable circular error probability radius, making it look like the vehicle spontaneously "teleports" small distances around where it really is at any given time. On the other hand, Dead Reckoned estimates may generate estimates with errors that are unbounded over time. These estimates are only erroneous by smaller multiples of € of shorter intervals, i.e. is only erroneous by n*€ which over shorter time frames is <<CEP [FIG. 7]. Thus, if we estimate location based on a smoothed weighted sum of the absolute coordinate fix-based location and the Dead Reckoned location, $w_0*[x_0+\Sigma\Delta x, y_0+\Sigma\Delta y, \beta_0+\Sigma\Delta\beta]+w_1*[x_1, x_1, x_1]$, and feed this back to the system as its best overall location solution, the Dead Reckoned component "filters" the absolute component's CEP error while the absolute component bounds the worst case Dead Reckoned error (i.e. keeps n*€<CEP).

Note that while this is described for movement over a two-dimensional surface, the approach readily generalizes to movement over three or more dimensions. Kalman filters combining both Absolute and Dead Reckoned localizations present one means for implementing the aforementioned approach, but other means that include position curve or line fitting, fuzzy logic, or combinations including probabilistically estimated weights are alternative implementations. Also note that direct position sensor like encoders measuring joint rotation or laser range finders of cameras measuring distance to walls, floors, ceilings, or specific objects are other forms of Absolute sensing as is GPS measurement made out of doors.

The preferred embodiment measures the Dead Reckoning Δs for material handing trucks by:

Measuring wheel revolutions (or alternatively drive shaft revolutions) for one or more of the wheels that make the vehicle move.

Measuring forces acting on the truck due to steering and acceleration/deceleration through force sensing inertial sensors (a position estimate in [x, y, z] can be estimated as [$\Sigma(\Delta x+vx0)+x0$, $\Sigma\Sigma\Delta Fy+vy0)+y0$, $\Sigma\Sigma\Delta Fz+vz0)+z0$], where [vx0, vy0, vz0] are initial velocities in x, y, and z, and [x0, y0, z0] (are initial positions).

Measuring angle changes due to truck steering and steering rate through angular inertial sensors (an orientation estimate [$\alpha,\beta,\gamma$] can be estimated as [$\Sigma F\Delta\alpha+\alpha0$, $\Sigma F\Delta\beta+\beta0$, $\Sigma F\Delta\gamma+\gamma0$], where [$\alpha0$, $\beta0$, $\gamma0$] are initial orientation angles.

Measuring orientation angle [$\alpha,\beta,\gamma$] as estimates deviation from North magnetic vector (i.e. through a magnetometer).

Floor Wires, Lines, or Magnetic Markers

Floor embedded wires and painted lines are readily detected by inexpensive inductive or optical array sensors and have been used for AGV navigation for many years. Where the marker is detected relative to sensor midpoint generates a steering error signal to keep the vehicle on track. To move from drive track to drive track or during maneuvers through lane track crossings (intersections) drive segments of open loop Dead Reckoning must be performed. Spacing to the next lane line marker should be small enough that accumulated Dead Reckoning error is less than the lock-in interval of the line tracking sensor. Magnetic markers work in a similar way. When a magnetic field detector array (for instance Hall effect sensor) is passed over the marker a steering error is generated by the position of the marker under the detector array. Since markers are placed at intervals, Dead Reckoning from one detected marker to the next must be accurate enough to detect the next marker within the detection array interval.

Row or Edge Following

Figure 9A:
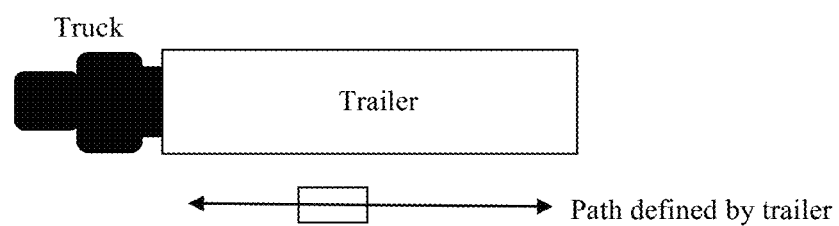
FIG. 9A shows how truck trailer beds or loading platforms provide edges that can define paths.

Autonomous trucks typically include forward, side-looking, and rear looking obstacle detection sensors, such as optical laser radars (LADAR or LIDAR), acoustic proximity sensors, or stereo range detecting vision systems (refer back to FIG. 1). These systems provide the driverless vehicle with direct sensing of how close it is to any potential collision. This data is used during driving to either trigger a stop and path replanning action or a path modification so as to steer around the potential obstacle collision. However, these systems also provide a means for detection of navigation relevant information as well. In a warehouse or container yard area [FIG. 8], the space is typically divided into rows or shelves of containers and free driving lanes that are placed between the rows or between a row and the wall, making of a rectilinear set of "roadways." As a truck drives along one of these roads, it is possible to detect the lane edges as vertical obstacle features organized roughly as walls to the right and left of the truck. Lane keeping in this type of environment can be achieved by directing the truck navigational system to "hug" either a left wall or a right wall maintaining a predetermined distance from that wall. As is the case for line or wire tracking discussed previous, the truck will periodically have to use another navigational mode at intersections of lanes, for instance, Dead Reckoning or alternative described below. Note that navigation along a loading or unloading platform of trailer can be accomplished in the same way [FIG. 9A].

Retroreflective Targets Tracking

Figure 9B:
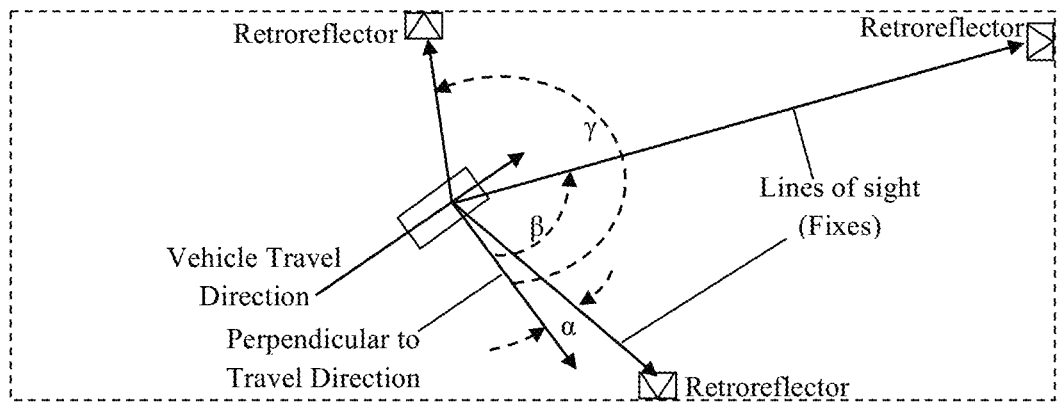
FIG. 9B depicts position and orientation from two or more fixes.

Units are available that rotate a laser beacon at a constant RPM shining the laser at even long distances against walls and vertical features extending up from the floor of the area of operation. When such a laser illuminates a retro-reflective patch (for instance, a retro reflector, reflective tape, or a corner cube) a sensitive optical detector is triggered in the unit and the angular position of the beam (0 to 360 degrees) is recorded as sighting fix [FIG. 9B]. Two such fixes and a known vehicle orientation (which might be determined by knowing the angle of the lane being travelled, by an orientation sensor such as magnetometer, or from a Dead Reckoned orientation estimate), or three fixes provide the means for detecting vehicle position and orientation within an operating area. Two fixes can provide a location but not an orientation, but several position fixes in a row or three fixes at a single point allow the orientation to be determined as well. Some AGV systems that do not employ wire or painted line tracking have employed this localization approach. The difficulties of this technique are twofold. First, one requires at least two line-of-sight fixes to localize and warehouse areas typically have many floor to ceiling stacks of material, column supports, or shelving units that block lines of sight (refer back to FIG. 8). Secondly, for the laser to hit a small target at long range it is necessary for the laser/detector to be very precisely level and aligned vertically with each target [FIG. 10]. Practically this puts a significant floor flatness criterion over the entire operating area, which might be constraining in work spaces with ramps and multiple levels.

Door Finding and Tracking

Figure 11:
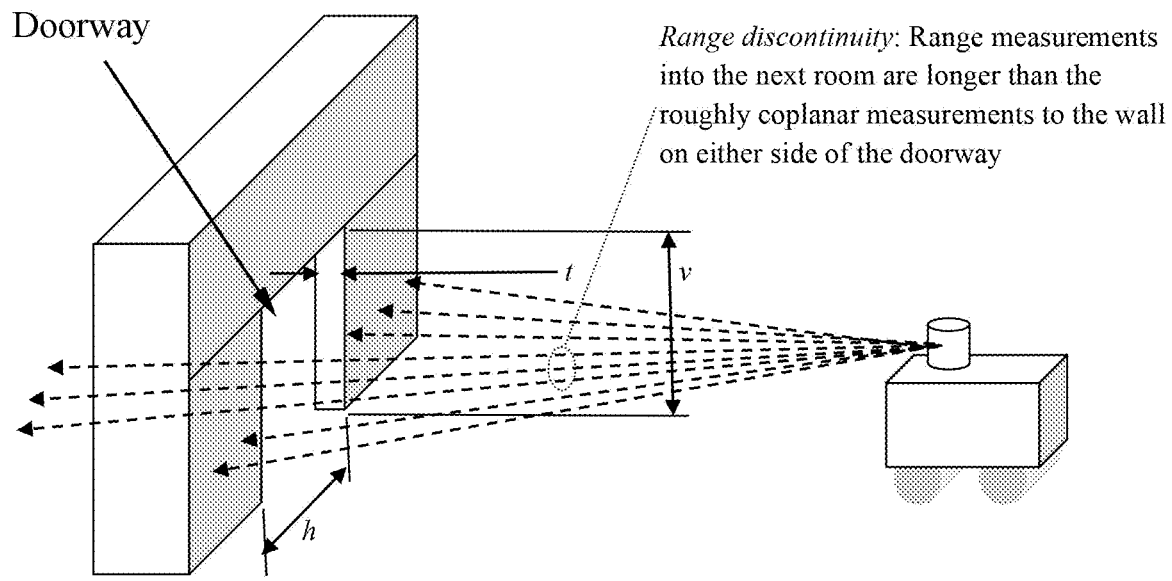
FIG. 11 illustrates doorway finding.

Many applications require a truck to move from one room or area into another through a wall opening, or a doorway. Doorways [FIG. 11] are characterized by (a) being visible at some distance along a drive track or lane at an approximately know predetermined location; (b) showing a range discontinuity (i.e. range to objects, obstacles, walls seen through the doorway are notably further way than the ranges to walls on either side of the doorway); (c) having an approximate vertical (v) and horizontal (h) width that is correct for the doorway (i.e. since we know approximately where we and therefore approximately what doorway we are looking at, the height or vertical clearance and the width should also approximately match the expected sizes for that doorway); (d) having an expected wall thickness, t, (i.e. as we move close to and through the doorway, we can track on the door jam, left or right or both, to maintain truck lane centering and for narrow doorways to avoid hitting on either side). When the doorway is reliably detected it allows the navigation system to locate truck position relative to the doorway FIG. 12 using the coordinate system defined by the vector, D, across the doorway opening and the vector, P, perpendicular to the doorway vector in the direction of the truck. Furthermore, since doorways so detected are fixed objects in the drive space, the doorway origin of a coordinate system defined by D and P can be used to provide an indoor absolute position fix to remove accumulated Dead Reckoning position estimation errors.

Figure 13:
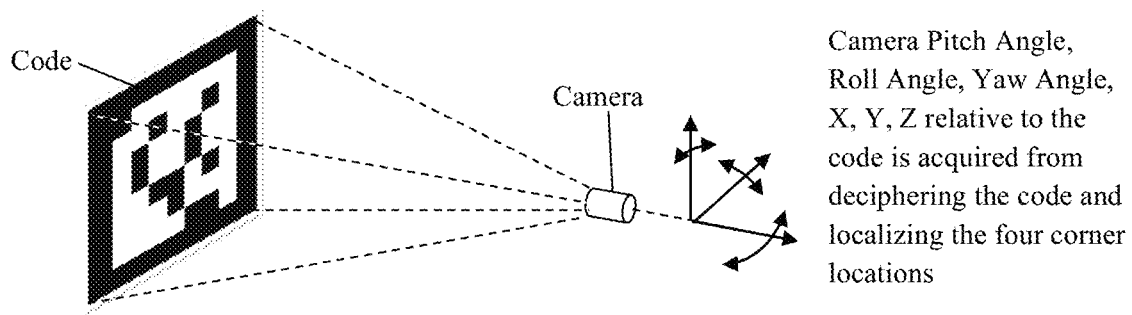
FIG. 13 depicts the way in which barcodes localize the camera (affixed to the lift) based on code location.

Barcodes, Reflectors, Lights to Mark Location within Code Visibility Operating Range Specialized location detecting bar codes have been used in augmented reality and some robotic applications for many years. Like all barcodes, these code are detected by algorithms the hypothesize presence of a code, attempt to read the code, and determine that the code was detected and read properly due to validation checksums present in correct codes, but not properly present in falsely detected codes. Barcodes for localization [FIG. 13] then identify geometrical properties of the code rectangle (the four corners) to determine the location in 3D space of the code relative to the reading sensor (or alternatively if the position of the code is known, the location of the reading sensor relative to that code position information). Localization codes are typically two-dimensional codes like ARTOOL Kit, ArTag, Goblin Tags, QR codes, Military Universal ID codes (UIDs), Microsoft "tag" codes, Maxicode, or DataMatrix so they are rectangles that have identifiable corners.

Figure 14:
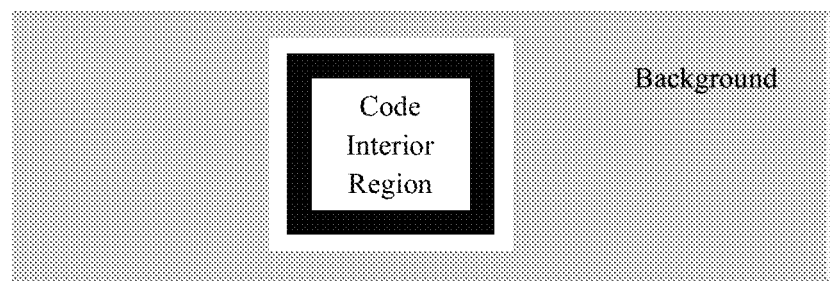
FIG. 14 depicts target barcodes surrounded by light to dark boarders.

Such codes also typically have quick target hypothesis features. For instance, most of the AR or augmented reality codes are black boxes surrounded by lighter regions (ideally a larger white rectangular box) so that the code recognizer can hypothesize a likely target location by finding the light dark transitions around the code [FIG. 14]. Some codes like QR, DataMatrix, or Maxicode use embedded simplified features (QR code uses three black-white-black target features in three of the four corners; DataMatrix uses a black edge on the left and lower side and a black cross through the center of the code; Maxicode uses a centered white-black-white-black-white-black-white bull's-eye). The algorithm looks for the code location hypothesis feature, then finds the code corners and interior region which contains binary encoded data, and then processes the interior data to acquire the data encoded by the barcode. This decoded data is then validated through checksum(s) or by look up into 1a legal codes list to determine if the code was properly read. If validated, the four corners of the code are used to determine the location of the code or the camera reading the code.

Figure 15:
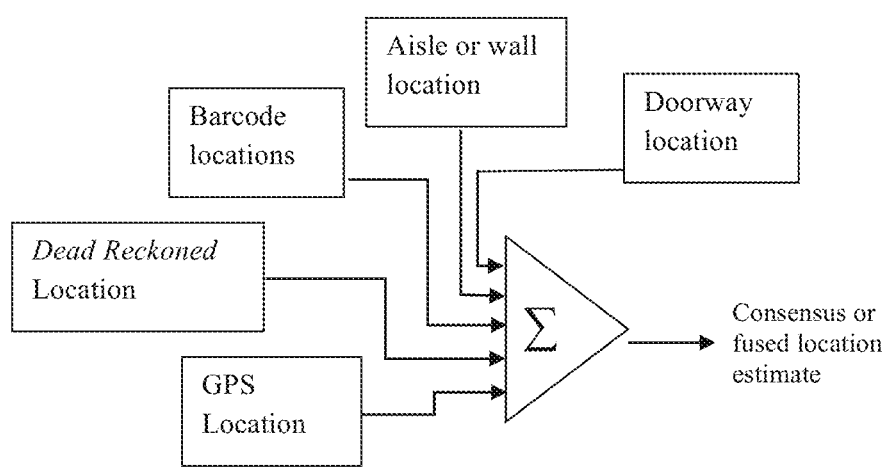
FIG. 15 shows location fusion based on localization features, GPS, and Dead Reckoning.

The codes and algorithms above provide a very flexible means for simplifying recognition of known locations for the automated robotic unit. Any location identifying code can be placed in the environment at a predetermined location. When a truck mounted camera sees the code at close enough range, it can automatically identify and decode the code and knows where the truck is relative to the code (Camera is located by the code image and where this code is known to be located in the environment, and then since the camera is mounted at a known location relative to the truck, the truck location becomes known in the environment). If multiple codes are detected in one or more cameras the truck location can be more accurately known through least squares estimation. Because the codes are visually unique in the environment, a single powerful recognition algorithm can detect them, by-passing the obvious alternative of recognizing a large variety of different visual features of the natural environment. On the other hand, mixing natural location features (such as doorways discussed previously) and placed features based on codes is easily accommodated through the truck localization data fusion process described previously for mixing GPS and Dead Reckoning, replacing GPS by location estimates derived from placed codes or natural features like the doorway [FIG. 15].

Figure 16:
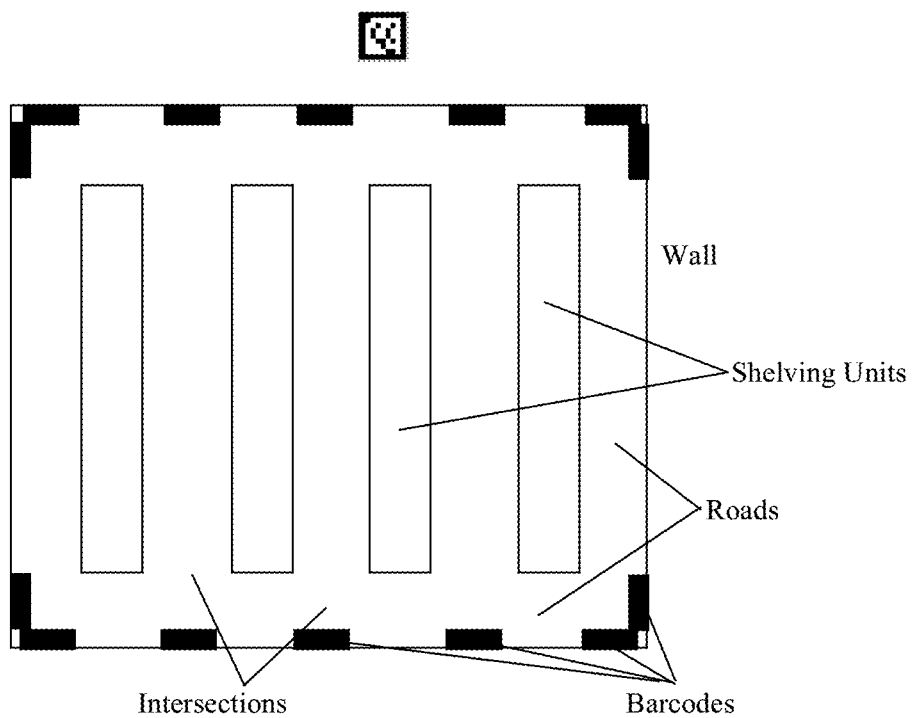
FIG. 16 illustrates how codes mark the ends of aisles or intersections.
Figure 18:
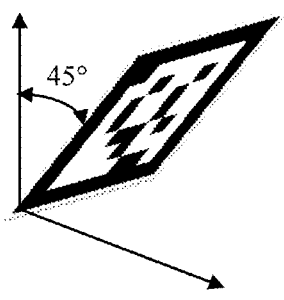
FIG. 18 depicts orienting codes to span depth improves range, pitch angle, and yaw angle accuracy.
Figure 19:
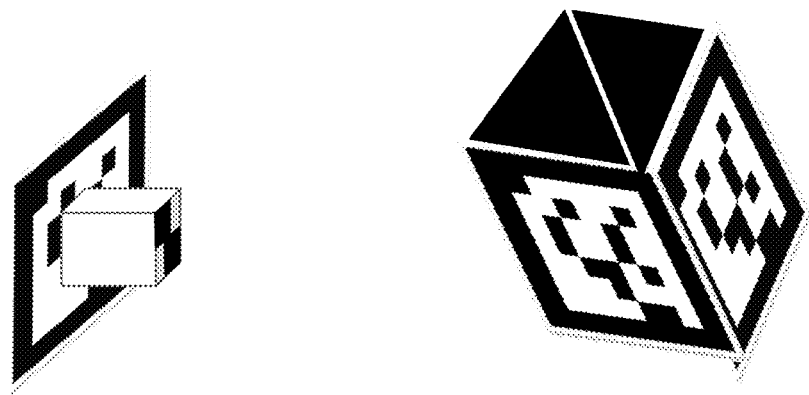
FIG. 19 shows targets with raised features to enhance range, pitch and yaw accuracy.

In our use of the codes, we suggest placing them at the end of travel lanes [FIG. 16], perhaps across intersections of at the corners of shelving units so that as a truck moves about the warehouse it sees codes at 5 to 50 meter intervals. If a code has to be visible from only a short distance, it might be made small so that it becomes resolvable only when the truck is close to an endpoint [FIG. 17]. On the other hand if a code will used to navigate along a long track it can be manufactured larger so it is resolvable from a greater range. The basic accuracy of the codes is directly proportional to the solid angle that it projects into the automated truck's camera pointed in roughly the direction of the code. Furthermore, the accuracy of localization based on the code depends on its orientation to the truck. Generally, more accuracy in angular resolution $[\alpha,\beta,\gamma]$ is achieved if the code is not oriented perpendicular to the vector from the truck sensor to the code [FIG. 18]. Tilting code up to 45 degrees to create target depth relative to the detecting sensor improves this angular resolution markedly. Note that some codes like the docking target that has been employed for robotic grasping of satellites in space by NASA provide this depth enhance angular resolutions by actually elevating part of the target code as shown in FIG. 19.

Each code detection provides the truck navigational system with an accurate driving direction relative to the target (steering angle to maintain a pitch yaw and roll fixed to the target center) and as the truck gets closer the corners are more accurately resolved yielding a full $[x, y, z, \alpha,\beta,\gamma]$ fix that can remove accumulated Dead Reckoning position errors. Thus, visual target fixes can provide indoor absolute localizations, substituting or augmenting GPS fixes that only operate accurately outdoors. Because the targets can be detected along an interval in both horizontal and vertical, they are superior to retro-reflective targets discussed previous because they tolerate better non-uniform floor angles and elevations, and allow for less precise positioning of the target themselves for easier making field deployment.

Floor or Ceiling Barcodes

Barcodes do not have to be placed as previously discussed on walls or at intersections like street signs. They can also be placed on the floor or the ceiling as easily. The codes can also be detected in exactly the same way and can be mapped to known locations through look up into a location data list based on the uniqueness of the interior content of the code. Ideally they should be placed at location not likely to be worn away by repeated automated truck operations (for instance, not where a truck wheel will repeatedly go over them). Codes on floors have to be maintained to accumulated dust and debris does not obscure them over time.

Row or Edge Following by Side Looking Barcodes

Figure 20A:
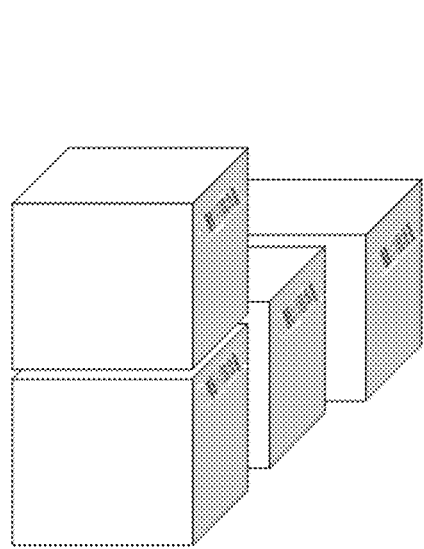
FIG. 20A illustrates a barcode on pallets.
Figure 20B:
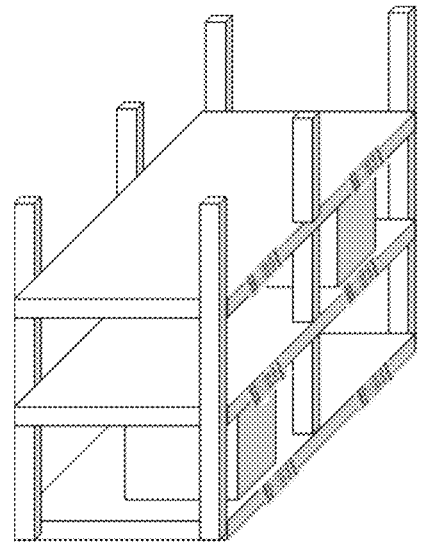
FIG. 20B illustrates barcodes on shelving or storage locations.

In earlier discussion of row or edge following, we described how a drive line can be maintained by tracking the vertical edge of a container stack, shelving unit, or wall sensed by collision detection sensors. In a similar manner, points along a shelving, container stack, or wall can be marked with 2D or 1D barcodes incidental to warehouse operation (FIG. 20). Each payload or pallet [1] might be so marked (e.g., with barcodes) as a way of unique identification, or pallet storage locations might be marked ([2] as discussed later) to define payload placement location or lot locations. These codes may be used for navigation when properly read, decoded and mapped to location. Each code can provide a unique vehicle to shelving unit location that can be tracked as easily as the geometrically defined shelf, container stack, or wall vertical geometric structure. Furthermore, even without mapping the code read to a specific location, the location of any valid code relative to a truck position in a drive lane can be used for lane keeping along a row.

End Point Maneuver to from Loads for Pick-Up or Placement

Figure 21:
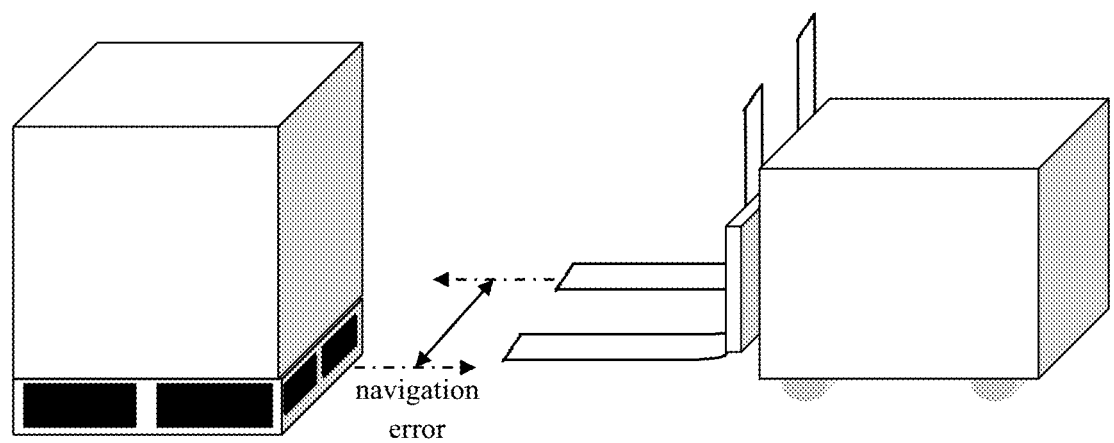
FIG. 21 depicts endpoint navigation error.

As referenced earlier, basic autonomous navigation includes some endpoint error that is bounded by the CEP of bounding or absolute sensors like GPS or the various optical, wire of line guided, or magnetic guidance sensors and build-up of error of dead reckoning from the last location estimate acquired by a bounding sensor fusion (FIG. 21). In our system this is typically between 2 to 20 cm depending on the bounding sensor CEP and nearness to both a known target or barcode location and how good the dead reckoning system can extrapolate from that location.

Pallet fork opening for a 48" pallet are nominally 16" wide and perhaps 4" high (40 cm. wide and 10 cm. high). So while it might be possible to navigate right into a pallet opening within the navigational system operating tolerance, there are factors that work against this. The first is that acquiring the load close to center of each pallet opening is more favorable so that the load of the pallet on the forks is well balanced. The second is that pallet put downs and stacks can possibly be off at the extremes of the navigational error range (+ or −20 cm of an extent of which is nominally the side of the pallet fork opening widths). Thirdly, in a warehouse where some of the pallets and stacks (alternatively referred to as lots) are placed by human drivers, they may or may not be place in exacting the right location. And finally, some putdown and pick-up locations may be relative to a target location (for instance, where a flat bed truck has been parked for loading or unloading—at an approximately known place but potentially off by one to several meters in any direction).

Therefore a practical autonomous material handling truck must be capable of modifying its endpoint for load engagement and disengagement based on cues that can be measured at the load or unload point. Our approach for endpoint guidance or navigation is therefore based on employing location features on the load (pallet) and on the point of pick-up or putdown (i.e. on the trailer, storage shelving unit, or pallets already defining the lot and stacks in the lot). The following approaches are applicable to various steps of the loading and unloading process:

Pallet Opening, Edges, and Top Locations

Using 3D Laser scanners that capture forward looking range fields, pallet locations and fork insertion point are readily detected because the front face of the pallet is closer to the sensor than surfaces behind, to the right or left, or on top of the top most pallet. Fork insertion points are detected at the bottom of a pallet. Tops are over the upper most pallet, and to find this might include using the fork truck forks to raise the 3D Laser scanner (or alternative range sensing means) up so that the boundary from top most pallet face to empty space above it is detected within the sensor's field of view. Edges to the right or left are detected as empty space beyond the pallet face surface detected (Alternatively for closely stacked containers, boundary marking might be used rather than empty edge spaces).

Figure 22:
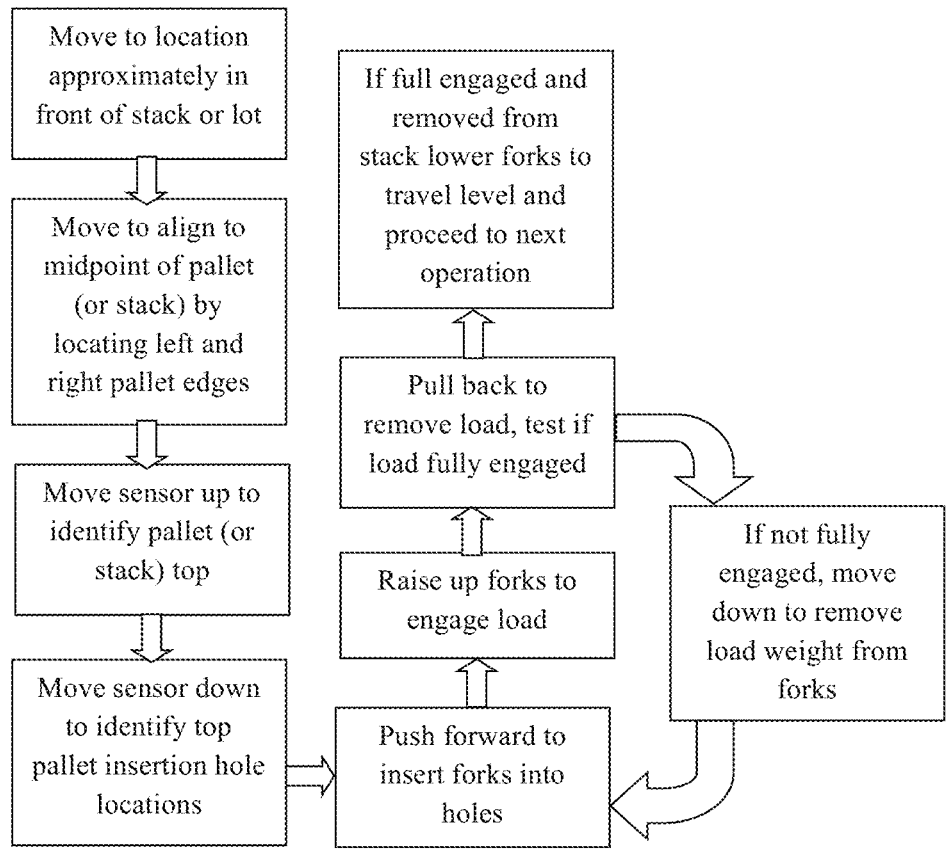
FIG. 22 shows top pallet engagement and removal.

Picking [FIG. 22] up a pallet is typically done lined up with the center line of the pallet left to right (½ the distance from the left side to the right side) and aligned vertically to the fork insertion locations of the topmost pallet. Thus, the algorithm will be to find the approximate pallet location left to right and center the truck on midpoint line, then move forks up until the laser scanner (or alternative range sensing means) sees the empty space over the topmost pallet, and finally move forks down until that topmost pallet's fork insertion holes are identified and localize. After this proper positioning, the truck (or forks only with a truck with telescoping forks or clamps) moves forward into the insertion holes until the pallet is fully engaged. The forks are raised, and the truck reverses to remove the pallet from its stack, and finally lowers the pallet to the safe travel position (approximately 12" from the ground). Note that to make this approach work each pallet stack must be separated by a small spacing (or other side demarcation that can be detected) and generally lots are separated from each other by a larger spacing. For pallets of containers that are in direct abutment, an alternative means for identifying edges is required. Generalized computer vision for this application being difficult, we use preplaced barcode, printed label identifiers or container edge markings.

Figure 23:
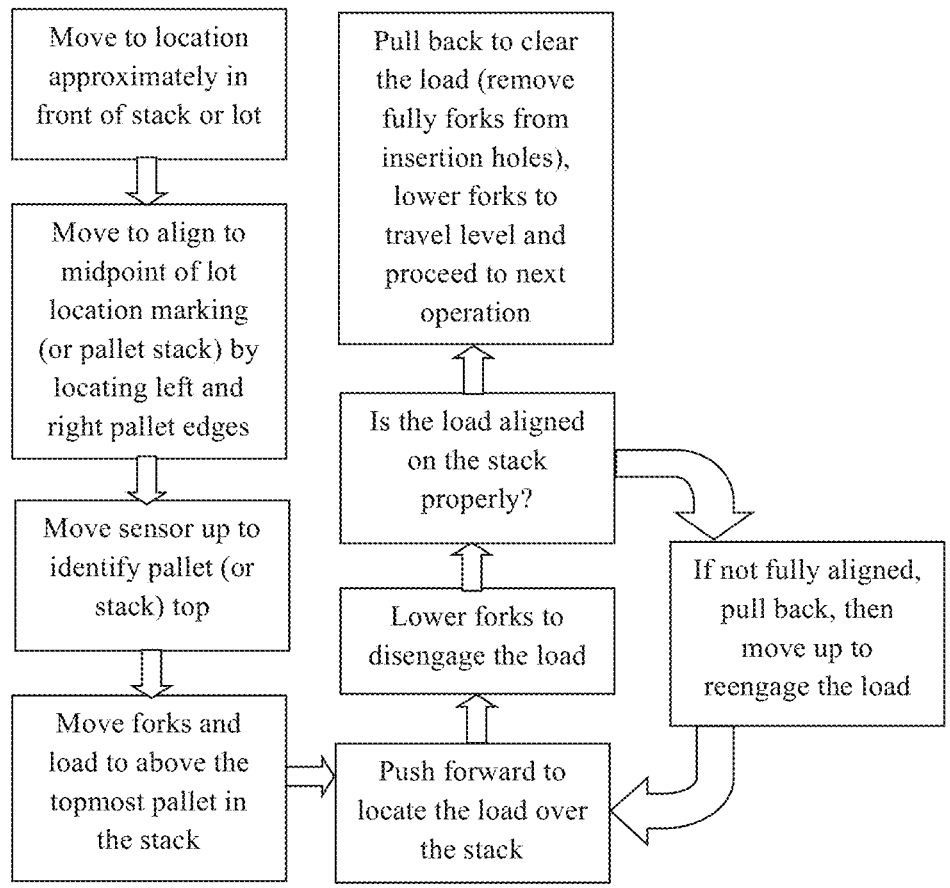
FIG. 23 illustrates pallet placement and disengagement.

When placing a pallet [FIG. 23] the placement location is also found by (a) moving to a predetermined location—see prior discussion on how first pallet locations can be localized, or (b) by lining up with the center line of the pallet left to right which is already placed (i.e. when the new pallet is being stacked onto an existing stack). To find this centerline follow the same procedure already described. To find the pallet stack top also use the approach previously described. However rather that scanning down to find the topmost pallet's fork insertion points, we raise the pallet being carried up so that it clears the topmost pallet, the truck moves forward into alignment with the stack, moves the forks down until the carried pallet contacts the stack, and then slight lowers further to remove the pallet weight from each form. It finally reverses to clear the forks from the pallet. Some warehouses have ceiling height limits so when raising pallet high enough to clear the top most pallet, we also monitor through a sensor the ceiling clearance. This sensor is likely to be a point laser distance measurement device but may be an alternative means like a pre-programmed fixed maximum mast extension height limit (enforce by height measurement in the mast movement assembly) or an alternative optical or other proximity sensor (video cameras, structured light, magnetic, acoustic).

In both cases above (placement and pick-up) the truck lowers the forks to the safe travel height (typically 12") and proceeds to navigate to the next pick-up or placement point respectively.

Figure 24:
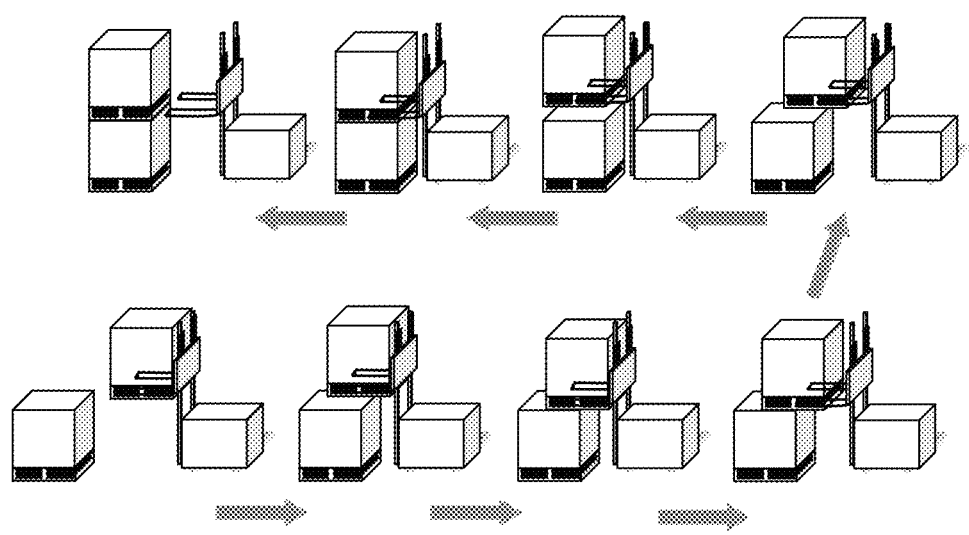
FIG. 24 shows multiple pick-up to place pallet in proper loaded position.
Figure 27:
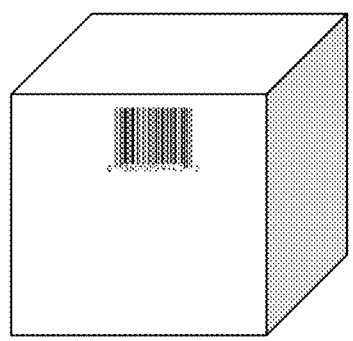
FIG. 27 illustrates barcodes to identify container or pallet contents or type.
Figure 28:
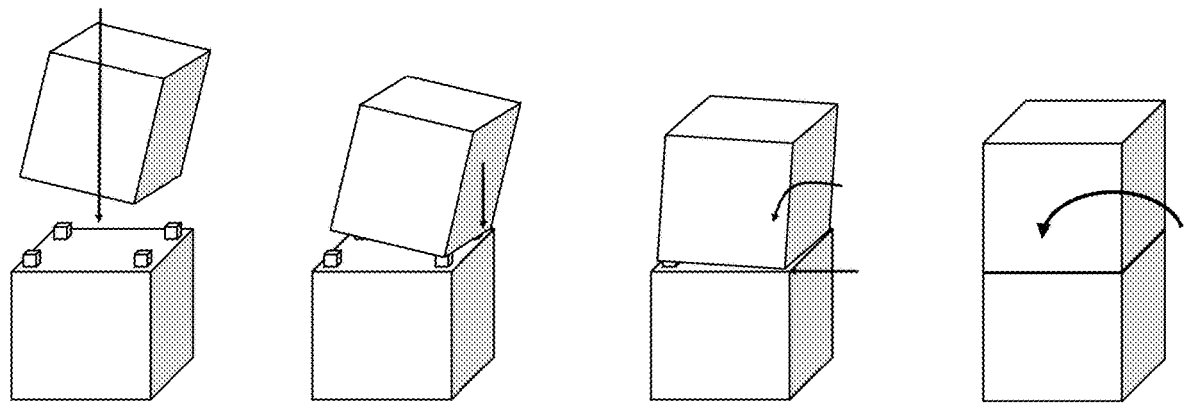
FIG. 28 depicts the placement of one pallet or container down pin-by-pin with pushes in between placements to align to the next pin to be engaged.

Refinements of the procedure include: (1) several putdown, fork repositions, and placement operations to scoot the pallet forward to proper placement or to firmly push the pallet up against the back of the fork carriage; FIG. 24; (2) using barcodes placed on known positions on the bottoms and or the tops of pallets for determining critical placement locations for each pallet to the next in the stack (or from pallet to first placement location)—FIG. 25; (3) using barcodes placed on known pallet locations to determine pallet left, right, up, down location FIG. 26; (4) using barcodes to verify that the pallet being handled is actually the correct one specified by the robotic trucks mission plan—FIG. 24; (5) using other means (printed labels, RFID, etc.) to verify that the pallet being handled is actually the correct one specified by the robotic trucks mission plan—also FIG. 27; (6) putting a container or pallet down one locating one or several pins at a time, relocating between each pin alignment and placement to allow physical realignment so that all of several pins (for instance 4 pins at container corners) become aligned and locked—FIG. 28.

Target Pick/Placement Locations by Identifying and Locating by Form Templates

The field of target recognition has been of interest to robotics and military for many years. Typically the way such system work is that the form of a location of interest is mathematically encoded as a scale and sometimes rotationally independent feature. One approach is as a dimension limited two-dimensional template (a matrix of values that capture the object at the designated location and can be matched against two-dimensional sub-matrices extracted from a sensor of beam-formed focal plane through cross correlation or least squares error minimization), another is through rotational invariant features (described, for example, in U.S. Pat. No. 6,173,066 to Peurach, et al., incorporated herein by reference), and third approach is through compound feature detectors that look for parts of an object based on relationships coded in a model or a procedural representation (generally model-based computer vision).

Figure 29:
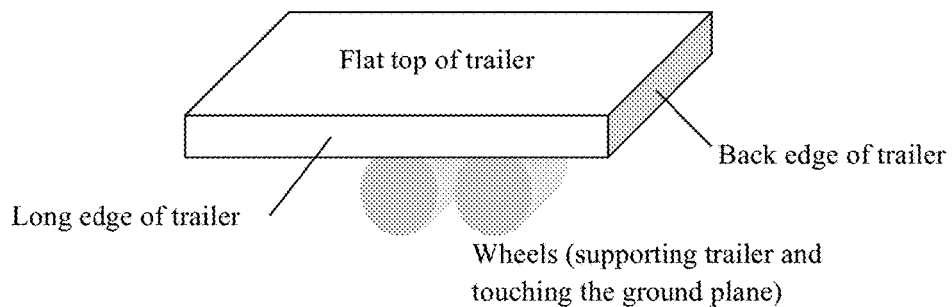
FIG. 29 shows a Truck Trailer Signature.

We do not generally advocate using these approaches for automated material handling applications because pallets are so varied that creating a small number of templates, rotational invariant features, or models to represent them is not possible. On the other hand there are interesting special cases such as:

Approaching a truck trailer or a loading platform from the side or the back—signature of the platform, such as wheels positions, back end position, trailer or dock flat platform, and empty space over the platform at some point along the platform length, can be identified by template or other models [FIG. 29].

Figure 12:
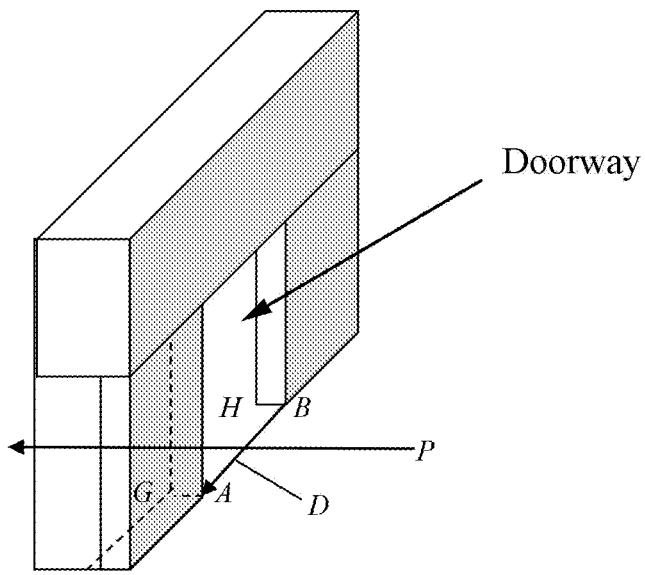
FIG. 12 shows doorway defined in an absolute coordinate system.

Identifying doorways—[FIG. 12] Because trucks approximately know where doorways are located, a signature that shows a surface at approximately the wall location, then an open space with depth deeper than the wall location, and then more wall after the open space can be interpreted as the doorway and truck location relative to the doorway can be determined from the two door frame edges A and B (or the coordinate system shown made from vector D and P). As the door way is approached and traversed, the door frame thickness and the relative position of the truck to the door frame can be tracked by also identifying edges G-A and H-B. For more complex door frames these identification can be further personalized to capture and utilize in matching these complexities.

Identifying a pallet stack—Signature is a pallet face bounded on each side by open space as has been described previously.

Identifying key parts of pallets or stacks (top, sides, fork hole at the pallet bottom)—Signature is edges or open hole areas has been as described previously.

Figure 30:
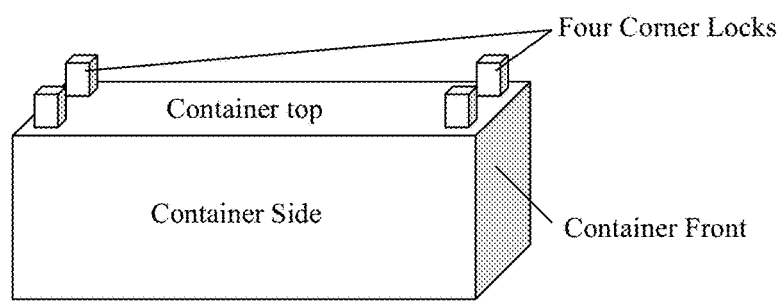
FIG. 30 shows an ISO Container Signature.

Identifying key parts of containers (top, sides, fork hole at the pallet bottom, or carrying pins on the top four corners)—Signatures are similar to those for pallets except that in addition to identifying them from front facing sensor it is also necessary to have signatures defined for approaching the contain from its top. From the top sides and top faces are identified as a generally rectangular top face of a rectangular prism. For ISO containers, each corner also has a unique signature for describing the locking pins that are used to lock the first container to a transport platform of some type (truck bed, ship deck, etc.) or another container upon which to stack subsequent containers [FIG. 30].

Identifying drive lanes between two parallel sets of pallets and/or shelving units—The signature is two nominally planar vertical features (they probably will not actually be planes, but virtual planes that separate an area on one side where not driving obstructions can be detected from the area on the other side where obstructions such as pallet faces or shaving unit supporting structures are detected) to the left and right defining a free drive or unobstructed area between.

In each of these cases, the environment is sampled by a sensor (either a camera or a range sensor), sample data is placed into a two-dimensional array (either by the sensor or by geometrical re-sampling of the input data to form such an array), and the template(s), features, or models are applied to the data at a range of locations (and orientations) about a hypothesized nominal points to determine which location matches the input sampled data the best. This best location (either a test location that minimizes match error or maximizes cross correlation) is the location of the item to be picked or placed upon if the match exceeds a critical match value of € (or for least squares is less than a match value of f). One the location is known relative to the material transport truck, robotically controlled movement and articulation movement can bring the truck load into the correct stacking location or can acquire a load and pick it up for transport to another location.

Figure 31:
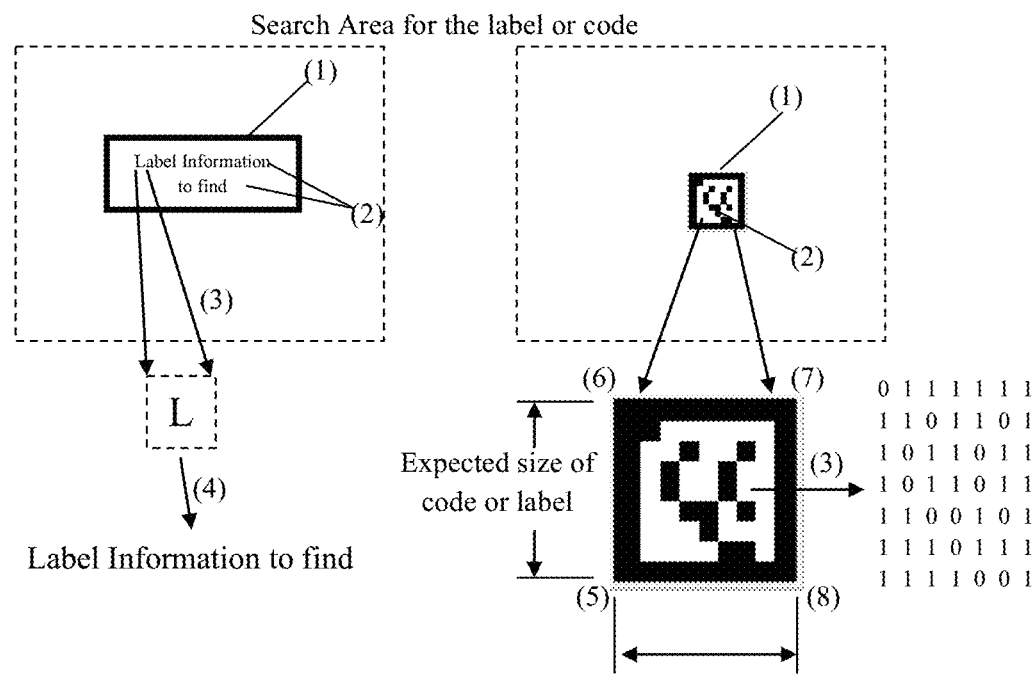
FIG. 31 depicts finding Labels or Barcodes.

Identifying Pallet Locations, Pallet Types, Lot Identifiers, and Key Isle-Way Locations by Barcode and/or Printed Label Identifiers Finding, identifying and reading barcoded or label printed information is a specialization of by identifying and locating by form, where the form is specifically designed to more reliably identified and validated [FIG. 31]. Identification of printed labels or signage is done through the following steps:

(1) Hypothesize (find candidate) labels generally by finding boxes lighter or darker than the surrounding background in imagery of approximately the expected size (i.e. sized in x and y dimension within a specified size range).

(2) Within the box find line spacing and character spacing (usually done by performing light on dark or dark on light histograms along the y axis (to find likely lines) and the x axis (to find likely letter spacings per hypothesized lines).

(3) Left to right box each character, normalize to standard size and match (either through multiple template matching or alternative like pre-trained neural nets).

(4) Convert letter matches into character strings, applying any error correction (for instance spell checking) or heuristic fill-in algorithms that can be used.

Identifying barcodes is similar:

(1) Hypothesize (find candidate) labels generally by finding boxes lighter or darker than the surrounding background in imagery of approximately the expected size (i.e. sized in x and y dimension within a specified size range).

(2) Within the box apply one or more one-dimensional or two-dimensional barcode finding algorithms: Usually normalize the label to front facing standard size followed by the barcode light to dark line or point finding code with translation into binary form.

(3) Most barcode algorithms include redundant binary information making it possible to perform either error checking or error correction.

In both cases above, if the label rectangle is correctly found, and the resolution, contrast, and algorithms operate correctly, a correct code is generated. If we assume that the code encodes a larger code set that is required for the mission of identification of products or locations required by the automated material handling system, most of the possible codes are unassigned. Therefore additional identification certainty is achieved when the finally decoded code or label is one that has an assigned meaning and/or location to the material handling system. For this reason, using codes or labels is preferred to any more general algorithm for identifying generalized forms.

Locating the label relative to the automated truck's label reading sensor (often a camera but sometimes a scanned laser reading device), is possible by knowing the location of the label sides, top/bottom, and therefore its corners. It is s simple exercise in three geometry and least squares fit minimization to compute the orientation and position of the label rectangle [x, y, z, and pitch, roll, yaw] from the camera measured $(5)[x_{low\ left}, y_{lower\ left}]$, $(6)[x_{upper\ left}, y_{upper\ left}]$, $(7)[x_{upper\ right}, y_{upper\ right}]$, $(8)[x_{lower\ right}, y_{lower\ right}]$ points. Error in especially range (distance between the camera and the label) is improved if the plane of the label is not parallel to the plane of the camera focal plane so that the label effectively subtends depth as well as extent vertical and horizontal.

Figure 17:
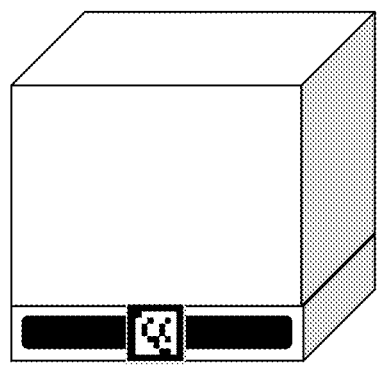
FIG. 17 shows small codes for uses like finding pallet location, pallet IDs, pallet fork holes.
Figure 25:
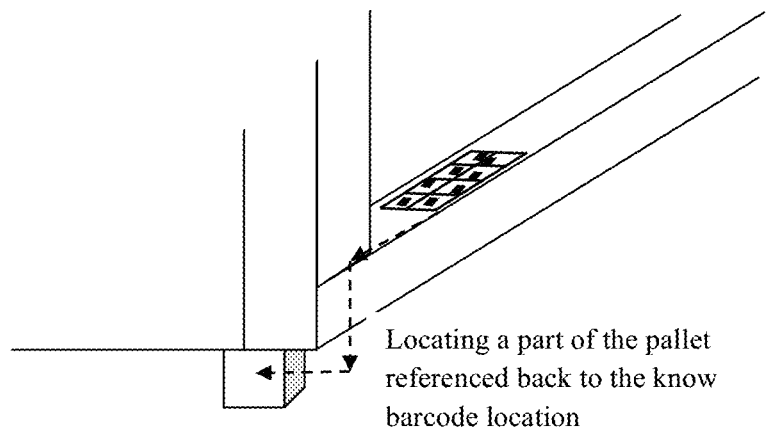
FIG. 25 illustrates barcodes to localize specific locations on a pallet or container.
Figure 26:
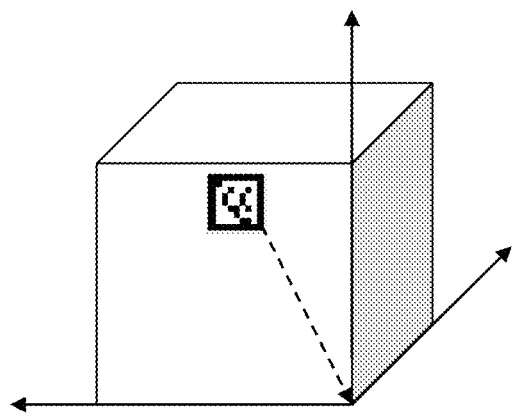
FIG. 26 illustrates barcodes to localize the entire pallet or container.

Thus an object can be reliably identified by assigning it a barcode or an easily decoded label and placing that label at a known location relative to the object's larger geometry (for instance at a known location relative to a pallet fork opening [FIG. 17], pallet face [FIG. 26], or container aspect [FIG. 25]). Furthermore, by identifying barcodes or labels as the automated vehicle progresses by them, therefore where they are relative to the truck, the truck can determine where it is with respect to the labeled objects, maintaining or updating is position estimate as it drives along aisles, to endpoint, pallet pick-up, etc. Because each code or label includes redundant information and item identifying information (either identifying known locations, or item identifying information), an automated truck can also use these labels as would a human picker to unambiguously identify each item or item placement location. Because codes are designed to span very large product identification spaces, practically, any item can be assigned a unique identification code.

Barcodes to Augment Aisle Movement

As described above, items placed on shelving units, items stacked in rows and columns, or shelving units or posts themselves can be labeled or barcoded [FIG. 20]. Therefore, as the automated truck (and cameras for code reading mounted on it) moves through the storage area, they can receive position updates derived from correctly decoded and identified codes or labels and localizing based on their known placement locations in the workspace (while rejecting misreads that map to unassigned codes or incorrectly decoded codes). As with all other means of vehicle localization, this information supports accurate lane keeping and location of the vehicle between segments of dead reckoning.

Barcodes to Identify Pallet of Pallet Location

Pallet or container retrieval requires approximate positioning of the retrieval material handler through its automated driving behaviors and localization means. However, error in this location knowledge and sometimes similar uncertainty about where a pallet or container is place in prior operations (or error in the position for the pallet/container place location) makes it necessary to update or correct placement location information when the automated truck is located close to its final point of load pick-up or drop.

By placing a localization label or barcode on the pallet or container at a known spot relative [FIG. 26] to is larger geometry, its location is easily precisely located within a proximal area (or alternative when a code is placed at a known location relative to a load stacking locations, the stacking location can be precisely known) without detailed knowledge of visual geometry of the load (or placement location). Therefore, using codes makes for a generalizable and easy to employ identifying means for pallet of pallet locations.

Barcodes to Identify Locations and Orientations of Pallets, Pallet Engagement Points, and Pallet Placement Points For certain operations like placing one pallet or container precisely on a stack of containers, the location of features of the containers have to be precisely known (for instance the locations of the corner hooks used for fastening ISO containers or JMIC pallets and locking them into stacks).

Specifically designed locating labels or codes [FIG. 25] can be used as an alternative to less reliable visual recognition schemes based on identifying and localized container geometries (through range or camera computer vision identification of forms algorithms). The placement of these reliably detectable and locatable codes or labels can be made so that knowing their locations also determined related nearby locations of container geometrical features by passing more generalized and less reliable computer vision approaches.

Figure 32A:
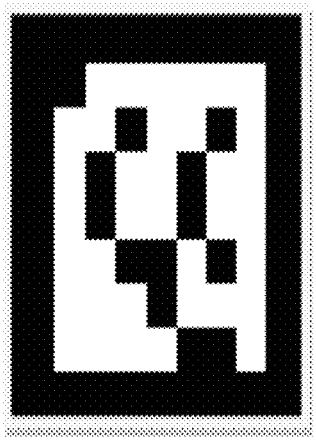
Figure 32B:
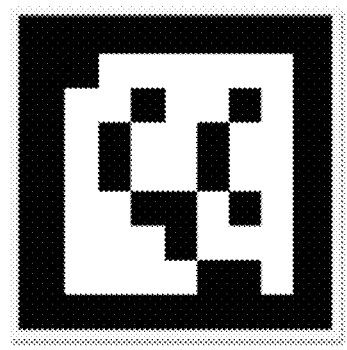
FIG. 32B illustrates the code of FIG. 32A as elongated when viewed with a highly slanted code of 45 degrees.

Notes on Practical Reliable Identification of Codes and Labels
   a) Codes are more reliably decoded if they include target boxes or features around their edges that resemble target bullseyes. Namely alternative areas or lines of light (white) and dark (black). [FIG. 14].
   b) Codes captured by active illuminators (lasers or bright lights) are less affected ambient lighting and shadowing so are more likely to be identified correctly in all illumination conditions.
   c) Codes that are to be used especially out of doors, have to tolerate deep shadows that can be cast by container and automated truck from high sun angles in bright daylight. A very effective means for creating this tolerance is to employ compound labels or codes made up of several different atomic (individual) codes, or codes organized in rows. In this kind of configuration, localization is possible if only one or several codes are correctly decoded, so if some codes are rendered useless due to a deep shadow, missing them does not affect the reliability to any significant degree. [FIG. 25—two rows of multiple codes].
   d) Codes to be used for range or depth estimation should be positioned so as to extend over a depth range. The plane of the sensor should not be parallel to the code plane. An ideal arrangement is to place the code rectangle approximately 45 degrees from the plane of the camera focal plane [FIG. 18]. Some compound codes are purpose built for more reliable depth determination. For example, raised features or pyramidal structures may be employed [FIG. 19]. These arrangements also improve accuracy in determining of pitch and yaw angle determination of the code relative to the sensor.
   e) Codes likely to be sensed from an extreme angle, can be extended in the foreshortening axis to improve localization accuracy [FIG. 32].
   f) Codes are sized so support the minimum and maximum range over which they are to be reliably decoded, identified and used for localization. For instance, a code for localizing a attachment hook when a pallet is very close to its final proper position for coupling might be quite small (say between a cm and an inch on a side). A code used to identify pallets and pallet holes might be larger to allow identification from several to 10s of feet (say 4"×4"). Codes designed to be reliably detected, decoded, and localized for general navigation within rows and lanes between shelves and containers (i.e. to be reliably seen out to 50 to 100 feet or more) might be very large (1'×1' to 1 meter×1 meter). Accuracy of localization is linked back to (a) how accurate a localization has to be, (b) how many pixels or scan angle increments have to subtend to code to allow for reliable decoding).

Linking Locations to Robotic Driving and Pick-Up Drop Operations

The automate material handling truck operates in a manner which is analogous to most know robotic devices. It is at a location known to some precision (and its articulations for loading and unloading are at know locations) measured by internal sensors and its localizations systems as described.

Each driving or manipulation operation is described by a series of incremental location changes (or alternatively a string of new nearby locations in sequence) to which the truck has to reconfigure or move itself to. The temporal string of new positions are typically generated from a piecewise continuous mathematically described curve which connects from the operation starting point to its intended endpoint. For driving this is points computed along prescribed paths planned from a warehouse or storage space map. For articulation elements (forks, mast elevation and tilt, etc.) this is computed as movement along approximately linear lines connecting starting points in [$x_{start}, y_{start}, z_{start}$, $pitch_{start}, roll_{start}, yaw_{end}$] to ending points [$x_{end}, y_{end}, z_{end}$, $pitch_{end}, roll_{end}, yaw_{end}$].

At each point, the measured position (indirectly measured through any combination of approaches previously describe and direct position measurement from on-board sensors where that is possible) of the truck and its articulations are compared to the points being generated from the motion plan (derived from maps or known endpoint locations for pick-up or drop as well as intermediate points). The difference becomes an error term which provides negative feedback to the truck motion control or servo systems bringing actual measure locations successively closer to the plan generate locations.

The key to smooth effective implementation of motion to accomplish mission objectives is (a) to maintain accurate knowledge of the current location through either direct high accuracy-high interval rate measure data (say from encoders, tilt measuring devices, inertial measurements, etc.) or by indirect fusion of all means for localization of the truck in its drive space and payloads in the warehouse or storage space (through a combination of the means already described or equivalent means). Since indirect measurement will inevitably be made periodically (and not continuously relative to the update rates required form motion controls) and to variably known precision, it is necessary to used (a) fusion to improve accuracy over individual measurements, and (b) provide direct means (i.e. encoders, tilt measuring devices, inertial measurements, etc.) that can be used to smoothly interpolate between indirect measurements. Earlier these two complimentary approaches for localization were termed dead reckoned or relative position determinations vs. absolute position determinations.

The invention claimed is:

1. A material handling vehicle, comprising:
    an interface facilitating access to one or more stored maps including driving rules and load attachment and load delivery locations;
    on-board global positioning satellite (GPS) geolocation and inertial sensing operative to determine the vehicle's own location relative to the load attachment and load delivery locations;
    video capture and processing apparatus operative to gather load pick-up and load placement information and facilitate unimpeded movement enabling the vehicle to navigate to and from the load attachment and load delivery locations in accordance with the driving rules, wherein the video capture and processing apparatus is further operative to identify a doorway by identifying a range discontinuity between a first wall surface adjacent to the doorway and a second wall surface past an opening of the doorway;
    wherein, when the vehicle determines that its location is proximate to one of the load attachment locations, the vehicle is operative to robotically acquire a load using the load pick-up information; and
    when the vehicle determines that its location is proximate to one of the load delivery locations, the vehicle is operative to robotically deliver the load to the load delivery location using the load placement information.

2. The material handling vehicle of claim 1, wherein the on-board GPS and inertial sensors enable the vehicle to determine its location within and outside of a warehouse, manufacturing facility or storage facility.

3. The material handling vehicle of claim 1, wherein the video capture and processing apparatus is operative to detect and identify loads to pick-up and deliver within and outside of a warehouse, manufacturing facility or storage facility.

4. The material handling vehicle of claim 1, wherein the video capture and processing apparatus is operative to detect and identify computer-readable codes.

5. The material handling vehicle of claim 4, wherein the computer-readable codes are barcodes.

6. The material handling vehicle of claim 1, wherein the video capture and processing apparatus enables the vehicle to locate, engage, and manipulate loads for pick-up, delivery, stacking and destacking operations.

7. The material handling vehicle of claim 1, wherein the video capture and processing apparatus are is operative to identify load types or lot identifiers.

8. The material handling vehicle of claim 1, wherein the video capture and processing apparatus is operative to identify load pick-up openings, load edges or load tops.

9. The material handling vehicle of claim 1, wherein the video capture and processing apparatus are is operative to identify openings in shelving units.

10. The material handling vehicle of claim 1, wherein the video capture and processing apparatus are is operative to target pick-and-place locations by identifying and locating templates or models.

11. The material handling vehicle of claim 1, wherein the video capture and processing apparatus is operative to identify travel lanes, roads, aisles, walls and shelving units.

12. The material delivery system of claim 1, wherein the driving rules correspond to human-like rules corresponding to the way in which a human driver would use to operate the vehicle.

13. The material delivery system of claim 12, wherein the human-like driving rules include one or more of the following:
    stopping and proceeding through intersections,
    stopping and proceeding through 2-way and 4-way stops,
    merging with other vehicles,
    maintaining a predetermined distance with respect to another vehicle,
    using a right-first rule when multiple vehicles arrive at an intersection at the same time, and
    obeying predetermined speed limits.

14. The material handling vehicle of claim 1, wherein the vehicle is a forklift.

15. The material handling vehicle of claim 1, wherein the vehicle is a delivery truck.

16. The material handling vehicle of claim 1, wherein the vehicle is a robot platform.

17. The material handling vehicle of claim 1, wherein the vehicle is capable of autonomous, semi-autonomous and manual operation.

* * * * *